US008326662B1

(12) United States Patent
Byrne et al.

(10) Patent No.: US 8,326,662 B1
(45) Date of Patent: Dec. 4, 2012

(54) POSITIONING E-COMMERCE PRODUCT RELATED TO GRAPHICAL IMPUTED CONSUMER DEMAND

(75) Inventors: Patrick Michael Byrne, Park City, UT (US); Geoffrey Russell Atkinson, Salt Lake City, UT (US)

(73) Assignee: Overstock.com, Inc., Salt Lake City, UT (US)

( * ) Notice: Subject to any disclaimer, the term of this patent is extended or adjusted under 35 U.S.C. 154(b) by 658 days.

(21) Appl. No.: 12/487,021

(22) Filed: Jun. 18, 2009

Related U.S. Application Data

(60) Provisional application No. 61/090,366, filed on Aug. 20, 2008, provisional application No. 61/073,590, filed on Jun. 18, 2008.

(51) Int. Cl.
*G06Q 40/00* (2012.01)
(52) U.S. Cl. ..................................... 705/7.11; 705/7.42
(58) Field of Classification Search ............. 705/7, 7.11, 705/7.42
See application file for complete search history.

(56) References Cited

U.S. PATENT DOCUMENTS

| | | | |
|---|---|---|---|
| 3,573,747 A | 4/1971 | Adams et al. |
| 3,581,072 A | 5/1971 | Nymeyer |
| 4,412,287 A | 10/1983 | Braddock, III |
| 4,674,044 A | 6/1987 | Kalmus et al. |
| 4,677,552 A | 6/1987 | Sibley, Jr. |
| 4,789,928 A | 12/1988 | Fujisaki |
| 4,799,156 A | 1/1989 | Shavit et al. |
| 4,808,987 A | 2/1989 | Takeda et al. |
| 4,823,265 A | 4/1989 | Nelson |
| 4,854,516 A | 8/1989 | Yamada |
| 4,903,201 A | 2/1990 | Wagner |
| RE33,316 E | 8/1990 | Katsuta et al. |
| 5,027,110 A | 6/1991 | Chang et al. |

(Continued)

FOREIGN PATENT DOCUMENTS

CA 2253543 10/1997

(Continued)

OTHER PUBLICATIONS

O'Mahony, "An X.500-based Product Catalogue," Electronic Markets—The International Journal, Oct. 1993, 2 pages, vol. 3, No. 3.

(Continued)

*Primary Examiner* — Thomas Dixon
*Assistant Examiner* — Benjamin S Fields
(74) *Attorney, Agent, or Firm* — Clayton, Howarth & Cannon, P.C.

(57) ABSTRACT

Example embodiments provide program products, systems, and associated methods of presenting a seller with a graphical representation of demand for a potential product listing so that the seller can intelligently price and position the product. A website server associated with a website of product listings captures in a database product preference criteria for a consumer, including, for example, price information. The website server aggregates the captured product preference criteria for a plurality of consumers and determines an imputed consumer demand for a potential product listing. The website server displays on a display device associated with a computer of a seller a multi-dimensional graph of demand for the potential product listing so that the seller can gauge market demand prior to listing a product for sale. Embodiments further include two-dimensional graphs plotting demand versus price, contour lines for the demand imposed on pricing graphs, and color-coded demand heat maps.

22 Claims, 17 Drawing Sheets

U.S. PATENT DOCUMENTS

| | | | |
|---|---|---|---|
| 5,053,956 A | 10/1991 | Donald et al. | |
| 5,063,507 A | 11/1991 | Lindsey et al. | |
| 5,077,665 A | 12/1991 | Silverman et al. | |
| 5,101,353 A | 3/1992 | Lupien et al. | |
| 5,136,501 A | 8/1992 | Silverman et al. | |
| 5,168,446 A | 12/1992 | Wiseman | |
| 5,205,200 A | 4/1993 | Wright | |
| 5,243,515 A | 9/1993 | Lee | |
| 5,258,908 A | 11/1993 | Hartheimer et al. | |
| 5,280,422 A | 1/1994 | Moe et al. | |
| 5,297,031 A | 3/1994 | Gutterman et al. | |
| 5,297,032 A | 3/1994 | Trojan et al. | |
| 5,301,350 A | 4/1994 | Rogan et al. | |
| 5,305,200 A | 4/1994 | Hartheimer et al. | |
| 5,325,297 A | 6/1994 | Bird et al. | |
| 5,329,589 A | 7/1994 | Fraser et al. | |
| 5,347,632 A | 9/1994 | Filepp et al. | |
| 5,375,055 A | 12/1994 | Togher et al. | |
| 5,394,324 A | 2/1995 | Clearwater | |
| 5,407,433 A | 4/1995 | Loomas | |
| 5,411,483 A | 5/1995 | Loomas et al. | |
| 5,426,281 A | 6/1995 | Abecassis | |
| 5,485,510 A | 1/1996 | Colbert | |
| 5,493,677 A | 2/1996 | Balogh et al. | |
| 5,553,145 A | 9/1996 | Micali | |
| 5,557,728 A | 9/1996 | Garrett et al. | |
| 5,579,471 A | 11/1996 | Barber et al. | |
| 5,596,994 A | 1/1997 | Bro | |
| 5,598,557 A | 1/1997 | Doner et al. | |
| 5,640,569 A | 6/1997 | Miller et al. | |
| 5,657,389 A | 8/1997 | Houvener | |
| 5,664,111 A | 9/1997 | Nahan et al. | |
| 5,664,115 A | 9/1997 | Fraser | |
| 5,689,652 A | 11/1997 | Lupien et al. | |
| 5,694,546 A | 12/1997 | Reisman | |
| 5,706,457 A | 1/1998 | Dwyer et al. | |
| 5,710,889 A | 1/1998 | Clark et al. | |
| 5,715,314 A | 2/1998 | Payne et al. | |
| 5,715,402 A * | 2/1998 | Popolo | 705/37 |
| 5,717,989 A * | 2/1998 | Tozzoli et al. | 705/37 |
| 5,721,908 A | 2/1998 | Lagarde et al. | |
| 5,722,418 A | 3/1998 | Bro | |
| 5,727,165 A * | 3/1998 | Ordish et al. | 705/37 |
| 5,737,599 A | 4/1998 | Rowe et al. | |
| 5,760,917 A | 6/1998 | Sheridan | |
| 5,761,496 A | 6/1998 | Hattori | |
| 5,761,655 A | 6/1998 | Hoffman | |
| 5,761,662 A | 6/1998 | Dasan | |
| 5,771,291 A | 6/1998 | Newton et al. | |
| 5,771,380 A | 6/1998 | Tanaka et al. | |
| 5,778,367 A | 7/1998 | Wesinger, Jr. et al. | |
| 5,790,790 A | 8/1998 | Smith et al. | |
| 5,794,216 A | 8/1998 | Brown | |
| 5,794,219 A | 8/1998 | Brown | |
| 5,796,395 A | 8/1998 | de Hond | |
| 5,799,285 A | 8/1998 | Klingman | |
| 5,803,500 A | 9/1998 | Mossberg | |
| 5,818,914 A | 10/1998 | Fujisaki | |
| 5,826,244 A | 10/1998 | Huberman | |
| 5,835,896 A | 11/1998 | Fisher et al. | |
| 5,845,265 A | 12/1998 | Woolston | |
| 5,845,266 A | 12/1998 | Lupien et al. | |
| 5,850,442 A | 12/1998 | Muftic | |
| 5,870,754 A | 2/1999 | Dimitrova et al. | |
| 5,872,848 A | 2/1999 | Romney et al. | |
| 5,873,069 A | 2/1999 | Reuhl et al. | |
| 5,873,080 A | 2/1999 | Coden et al. | |
| 5,884,056 A | 3/1999 | Steele | |
| 5,890,138 A | 3/1999 | Godin et al. | |
| 5,890,175 A | 3/1999 | Wong et al. | |
| 5,905,975 A | 5/1999 | Ausubel | |
| 5,907,547 A | 5/1999 | Foladare et al. | |
| 5,913,215 A | 6/1999 | Rubinstein et al. | |
| 5,922,074 A | 7/1999 | Richard et al. | |
| 5,924,072 A | 7/1999 | Havens | |
| 5,926,794 A | 7/1999 | Fethe | |
| 5,948,040 A | 9/1999 | DeLorme et al. | |
| 5,948,061 A | 9/1999 | Merriman et al. | |
| 5,974,412 A | 10/1999 | Hazlehurst et al. | |
| 5,986,662 A | 11/1999 | Argiro et al. | |
| 5,987,446 A | 11/1999 | Corey et al. | |
| 5,991,739 A | 11/1999 | Cupps et al. | |
| 5,999,915 A | 12/1999 | Nahan et al. | |
| 6,012,053 A | 1/2000 | Pant et al. | |
| 6,029,141 A | 2/2000 | Bezos et al. | |
| 6,035,288 A * | 3/2000 | Solomon | 705/37 |
| 6,035,402 A | 3/2000 | Vaeth et al. | |
| 6,044,363 A | 3/2000 | Mori et al. | |
| 6,045,447 A | 4/2000 | Yoshizawa et al. | |
| 6,047,264 A | 4/2000 | Fisher et al. | |
| 6,055,518 A | 4/2000 | Franklin et al. | |
| 6,058,379 A | 5/2000 | Odom et al. | |
| 6,058,417 A | 5/2000 | Hess et al. | |
| 6,058,428 A | 5/2000 | Wang et al. | |
| 6,061,448 A | 5/2000 | Smith et al. | |
| 6,065,041 A | 5/2000 | Lum et al. | |
| 6,070,125 A | 5/2000 | Murphy et al. | |
| 6,073,117 A | 6/2000 | Oyanagi et al. | |
| 6,078,914 A | 6/2000 | Redfern | |
| 6,085,176 A | 7/2000 | Woolston | |
| 6,104,815 A | 8/2000 | Alcorn et al. | |
| 6,119,137 A | 9/2000 | Smith et al. | |
| 6,128,649 A | 10/2000 | Smith et al. | |
| 6,141,010 A | 10/2000 | Hoyle | |
| 6,167,382 A | 12/2000 | Sparks et al. | |
| 6,178,408 B1 | 1/2001 | Copple et al. | |
| 6,185,558 B1 | 2/2001 | Bowman et al. | |
| 6,192,407 B1 | 2/2001 | Smith et al. | |
| 6,199,077 B1 | 3/2001 | Inala et al. | |
| 6,202,051 B1 | 3/2001 | Woolston | |
| 6,202,061 B1 | 3/2001 | Khosla et al. | |
| 6,226,412 B1 | 5/2001 | Schwab | |
| 6,243,691 B1 | 6/2001 | Fisher et al. | |
| 6,269,238 B1 | 7/2001 | Iggulden | |
| 6,271,840 B1 | 8/2001 | Finseth et al. | |
| 6,275,820 B1 | 8/2001 | Navin-Chandra et al. | |
| 6,275,829 B1 | 8/2001 | Angiulo et al. | |
| 6,356,879 B2 | 3/2002 | Aggarwal et al. | |
| 6,356,908 B1 | 3/2002 | Brown et al. | |
| 6,366,899 B1 | 4/2002 | Kernz | |
| 6,370,527 B1 | 4/2002 | Singhal | |
| 6,373,933 B1 | 4/2002 | Sarkki et al. | |
| 6,374,260 B1 | 4/2002 | Hoffert et al. | |
| 6,381,510 B1 | 4/2002 | Amidhozour et al. | |
| 6,415,320 B1 | 7/2002 | Hess et al. | |
| 6,434,556 B1 | 8/2002 | Levin et al. | |
| 6,456,307 B1 | 9/2002 | Bates et al. | |
| 6,460,020 B1 | 10/2002 | Pool et al. | |
| 6,466,917 B1 | 10/2002 | Goyal et al. | |
| 6,484,149 B1 | 11/2002 | Jammes et al. | |
| 6,489,968 B1 | 12/2002 | Ortega et al. | |
| 6,523,037 B1 | 2/2003 | Monahan et al. | |
| 6,601,061 B1 | 7/2003 | Holt et al. | |
| 6,604,107 B1 | 8/2003 | Wang | |
| 6,643,696 B2 | 11/2003 | Davis et al. | |
| 6,665,838 B1 | 12/2003 | Brown et al. | |
| 6,701,310 B1 | 3/2004 | Sugiura et al. | |
| 6,728,704 B2 | 4/2004 | Mao et al. | |
| 6,732,161 B1 | 5/2004 | Hess et al. | |
| 6,732,162 B1 | 5/2004 | Wood et al. | |
| 6,856,963 B1 | 2/2005 | Hurwitz | |
| 6,889,054 B2 | 5/2005 | Himmel et al. | |
| 7,076,453 B2 | 7/2006 | Jammes et al. | |
| 7,100,111 B2 | 8/2006 | McElfresh et al. | |
| 7,117,207 B1 | 10/2006 | Kerschberg et al. | |
| 7,127,416 B1 | 10/2006 | Tenorio | |
| 7,165,091 B2 | 1/2007 | Lunenfeld | |
| 7,167,910 B2 | 1/2007 | Farnham et al. | |
| 7,216,115 B1 | 5/2007 | Walters et al. | |
| 7,340,249 B2 | 3/2008 | Moran et al. | |
| 7,349,668 B2 | 3/2008 | Ilan et al. | |
| 7,380,217 B2 | 5/2008 | Gvelesiani | |
| 7,454,464 B2 | 11/2008 | Puthenkulam et al. | |
| 7,496,582 B2 | 2/2009 | Farnham et al. | |
| 7,552,067 B2 * | 6/2009 | Nephew et al. | 705/7.25 |
| 7,606,743 B2 * | 10/2009 | Orzell et al. | 705/28 |
| 7,610,212 B2 * | 10/2009 | Klett et al. | 705/7.12 |

| | | | |
|---|---|---|---|
| 7,653,573 | B2 | 1/2010 | Hayes, Jr. et al. |
| 7,983,950 | B2* | 7/2011 | De Vita ............... 705/26.61 |
| 2001/0034667 | A1 | 10/2001 | Petersen |
| 2001/0034668 | A1 | 10/2001 | Whitworth |
| 2001/0044751 | A1 | 11/2001 | Pugliese et al. |
| 2001/0047290 | A1 | 11/2001 | Petras et al. |
| 2001/0051996 | A1 | 12/2001 | Cooper et al. |
| 2002/0002513 | A1 | 1/2002 | Chiasson |
| 2002/0022995 | A1 | 2/2002 | Miller et al. |
| 2002/0023059 | A1 | 2/2002 | Bari et al. |
| 2002/0026390 | A1* | 2/2002 | Ulenas et al. ............ 705/27 |
| 2002/0029187 | A1* | 3/2002 | Meehan et al. ............ 705/37 |
| 2002/0042738 | A1 | 4/2002 | Srinivasan et al. |
| 2002/0099602 | A1 | 7/2002 | Moskowitz et al. |
| 2002/0107718 | A1 | 8/2002 | Morrill et al. |
| 2002/0129282 | A1 | 9/2002 | Hopkins |
| 2002/0147625 | A1 | 10/2002 | Kolke, Jr. |
| 2002/0161648 | A1 | 10/2002 | Mason et al. |
| 2002/0198784 | A1 | 12/2002 | Shaak et al. |
| 2003/0004855 | A1 | 1/2003 | Dutta et al. |
| 2003/0009392 | A1* | 1/2003 | Perkowski ............... 705/26 |
| 2003/0036914 | A1 | 2/2003 | Fitzpatrick et al. |
| 2003/0041008 | A1 | 2/2003 | Grey et al. |
| 2003/0046149 | A1 | 3/2003 | Wong |
| 2003/0069740 | A1 | 4/2003 | Zeidman |
| 2003/0088511 | A1 | 5/2003 | Karboulonis et al. |
| 2003/0093331 | A1 | 5/2003 | Childs et al. |
| 2003/0110100 | A1 | 6/2003 | Wirth, Jr. |
| 2003/0131095 | A1 | 7/2003 | Kumhyr et al. |
| 2003/0139969 | A1 | 7/2003 | Scroggie et al. |
| 2003/0158792 | A1 | 8/2003 | Perkowski |
| 2003/0163340 | A1 | 8/2003 | Fitzpatrick et al. |
| 2003/0167213 | A1 | 9/2003 | Jammes et al. |
| 2003/0217002 | A1 | 11/2003 | Enborg |
| 2004/0006509 | A1 | 1/2004 | Mannik et al. |
| 2004/0015416 | A1 | 1/2004 | Foster et al. |
| 2004/0055017 | A1 | 3/2004 | Delpuch et al. |
| 2004/0078388 | A1 | 4/2004 | Melman |
| 2004/0128320 | A1 | 7/2004 | Grove et al. |
| 2004/0172379 | A1 | 9/2004 | Mott et al. |
| 2004/0174979 | A1 | 9/2004 | Hutton et al. |
| 2004/0204991 | A1 | 10/2004 | Monahan et al. |
| 2004/0249727 | A1 | 12/2004 | Cook, Jr. et al. |
| 2005/0021666 | A1 | 1/2005 | Dinnage et al. |
| 2005/0038733 | A1 | 2/2005 | Foster et al. |
| 2005/0044254 | A1 | 2/2005 | Smith |
| 2005/0060664 | A1 | 3/2005 | Rogers |
| 2005/0097204 | A1 | 5/2005 | Horowitz et al. |
| 2005/0131837 | A1 | 6/2005 | Sanctis et al. |
| 2005/0203888 | A1 | 9/2005 | Woosley et al. |
| 2005/0273378 | A1 | 12/2005 | MacDonald-Korth et al. |
| 2006/0009994 | A1 | 1/2006 | Hogg et al. |
| 2006/0031240 | A1 | 2/2006 | Eyal et al. |
| 2006/0041638 | A1 | 2/2006 | Whittaker et al. |
| 2006/0058048 | A1 | 3/2006 | Kapoor et al. |
| 2006/0069623 | A1 | 3/2006 | MacDonald Korth et al. |
| 2006/0085251 | A1 | 4/2006 | Greene |
| 2006/0173817 | A1 | 8/2006 | Chowdhury et al. |
| 2007/0073641 | A1 | 3/2007 | Perry et al. |
| 2007/0078726 | A1 | 4/2007 | MacDonald Korth et al. |
| 2007/0245013 | A1 | 10/2007 | Saraswathy et al. |
| 2008/0162574 | A1* | 7/2008 | Gilbert ............... 707/104.1 |
| 2011/0060621 | A1* | 3/2011 | Weller et al. ............ 705/7.29 |

FOREIGN PATENT DOCUMENTS

| | | |
|---|---|---|
| CA | 2347812 | 5/2000 |
| EP | 0636993 | 4/1999 |
| EP | 0807891 | 5/2000 |
| EP | 1241603 | 3/2001 |
| JP | 2001283083 | 10/2001 |
| WO | 97/17663 | 5/1997 |
| WO | 98/32289 | 7/1998 |
| WO | 98/47082 | 10/1998 |
| WO | 99/59283 | 11/1999 |
| WO | 00/25218 | 5/2000 |

OTHER PUBLICATIONS

"Onsale: Onsale Brings Thrill of Auctions and Bargain Hunting Online; Unique Internet retail service debuts with week-long charity auction for the Computer Museum in Boston," May 24, 1995, printed from www.dialogweb.com/cgi/dwclient?dwcommand=DWEBPRINT%20810-489267.

"ONSALE joins fry as online shopping picks up speed: Internet Booms," Computer Reseller News, Jun. 5, 1995, p. 73.

Palm, Inc., Palm™ Web Pro Handbook, copyright 2002-2003.

Post et al., "Application of Auctions as a Pricing Mechanism for the Interchange of Electric Power," IEEE Transactions on Power Systems, Aug. 1995, pp. 1580-1584, vol. 10, No. 3.

Preist et al., "Adaptive agents in a persistent shout double auction," International Conference on Information and Computation, Proceedings of the first international conference on Information and computation economies, Oct. 25-28, 1998, Charleston, United States, pp. 11-18.

Qualcomm, "Brew Developer Support," printed from web.archive.org/web/20020209194207/http://www.qualcomm.com/brew/developer/support/kb/52.html on Aug. 30, 2007.

RCR Wireless News, "Lockheed Martin to use 2Roam's technology for wireless platform," RCR Wireless News, Sep. 10, 2001.

Reck, "Formally Specifying an Automated Trade Execution System," J. Systems Software, 1993, pp. 245-252. vol. 21.

Reck, "Trading-Process Characteristics of Electronic Auctions," Electronic Markets—The International Journal, Dec. 1997, pp. 17-23, vol. 7, No. 4.

REPCHECK.COM, www.repcheck.com homepage, printed from web.archive.org/web/20020330183132/http://repcheck.com on Sep. 5, 2009.

Resnick et al., "Reputation Systems," Communications of the ACM, Dec. 2000, pp. 45-48, vol. 43, No. 12.

Rockoff et al., "Design of an Internet-based system for remote Dutch auctions," Internet Research: Electronic Networking Applications and Policy, 1995, pp. 10-16, vol. 5, No. 4.

Rysavy, "Mobile-commerce ASPs do the legwork," Network Computing, Jan. 22, 2001, p. 71, 6 pgs., vol. 12, No. 2.

Saunders, "AdFlight to Offer WAP Ads," Oct. 17, 2000, printed from clickz.com/487531/print.

Schmid, "Electronic Markets," Electronic Markets—The International Journal, Oct. 1993, 2 pages, vol. 3, No. 3.

Schwankert, "Matsushita Taps 2Roam for Wireless Solutions," www.internetnews.com/bus-news.article.php/674811, Feb. 2, 2001.

Siegmann, "Nowhere to go but up," PC Week, Oct. 23, 1995, 3 pages, vol. 12, No. 42.

Telephony Staff, "Air-ASP," Telephony Online, Oct. 2, 2000, 3 pages.

TEO, "Organizational Factors of Success in Using EDIS: A Survey of Tradenet Participants," Electronic Markets—The International Journal, Oct. 1993, 2 pages, vol. 3, No. 3.

Tjostheim et al., "A case stud of an on-line auction for the World Wide Web," printed from www.nr.no/gem/elcom/publikasjoner/enter98e.html on Jun. 10, 1999, 10 pages.

Turban, "Auctions and Bidding on the Internet: An Assessment," Electronic Markets—The International Journal, Dec. 1997, 5 pages, vol. 7, No. 4.

UBID.COM, "How do I Update my Address, Phone, Credit Card, Password, etc.?" printed from web.archive.org/web/20010208113903/www.ubid.com/help/topic13.asp on Aug. 30, 2007.

UBID.COM, "How do I track my shipment?" printed from web.archive.org/web/20010331032659/www.ubid.com/help/topic27.asp on Aug. 30, 2007.

UBID.COM, "Can I track all my bids from My Page?" printed form web.archive.org/web120010208114049/www.ubid.com/help/topic14.asp on Aug. 30, 2007.

Van Heck et al., "Experiences with Electronic Auctions in the Dutch Flower Industry," Electronic Markets—The International Journal, Dec. 1997, 6 pages, vol. 7, No. 4.

Verizon Wireless, "Verizon Wireless Customers Get It NowSM; Get Games, Get Pix, Get Ring Tones and Get Going in Full Color," press release to PRNEWSIRE, Sep. 23, 2002.

Warbelow et al., "AUCNET: TV Auction Network System," Harvard Business School 9-190-001, Jul. 19, 1989, rev. Apr. 12, 1996, pp. 1-15.

Weber, "How Financial Markets are Going On-line," Electronic Markets—The International Journal, Oct. 1993, 2 pages, vol. 3, No. 3.

Wireless Internet, "DailyShopper Selects 2Roam to Enable Mobile Customers to Retrieve Nearby Sales and Promotions Information," Wireless Internet, Apr. 2001.

Wireless Week, "Verizon Wireless Gets Going on BREW Agenda," Wireless Week, Sep. 23, 2002.

XCHANGER.NET, webpage printed from www.auctiva.com/showcase/as_4sale.asp?uid=xchanger, undated but at least as early as Oct. 12, 2000.

Yu et al., "Distributed Reputation Management for Electronic Commerce," Computational Intelligence, 2002, pp. 535-549, vol. 18, No. 4.

Zetmeir, Auction Incentive Marketing, print of all pages of website found at home.earthlink.net/~bidpointz/ made Oct. 8, 2004.

Zimmermann, "Integration of Financial Services: The TeleCounter," Electronic Markets—The International Journal, Oct. 1993, 1 page, vol. 3, No. 3.

Zwass, "Electronic Commerce: Structures and Issues," International Journal of Electronic Commerce, Fall 1996, pp. 3-23, vol. 1, No. 1.

2ROAM, Inc., multiple archived pages of www.2roam.com retrieved via Internet Archive Wayback Machine on Jun. 10, 2008.

Alt et al., "Bibliography on Electronic Commerce," Electronic Markets—The International Journal, Oct. 1993, 5 pages, vol. 3, No. 3.

Alt et al., "Computer Integrated Logistics," Electronic Markets—The International Journal, Oct. 1993, 1 page, vol. 3, No. 3.

AUCTIONWATCH.COM, multiple pages—including search results for "expedition," printed Apr. 21, 2001.

AUCTIVA.COM, multiple pages, undated but website copyright date is "1999-2000."

Braganza, "Is Research at Cranfield—A Look at the Future," Electronic Markets—The International Journal, Oct. 1993, 1 page, vol. 3, No. 3.

Brecht et al., "The IM 2000 Research Programme," Electronic Markets—The International Journal, Oct. 1993, 1 page, vol. 3, No. 3.

Business Wire business editors/high-tech writers, "2Roam Partners With Pumatech to Delivery Wireless Alerts," Business Wire, Dec. 18, 2000.

Business Wire business editors/high-tech writers, "2Roam Takes eHow's How-to Solutions Wireless: With 2Roam, the Web's One-Stop Source for Getting Things Done is on More Wireless Devices, with Ability to Purchase its Products from Anywhere," Business Wire, Oct. 2, 2000.

Business Wire business editors/high-tech writers, "2Roam Drives Hertz to the Wireless Web; Number One Car Rental Company to Provide Customers Wireless Access From Any Device," Business Wire, Aug. 7, 2001.

BUY.COM, www.buy.com homepage, printed Oct. 13, 2004.

Clarke, "Research Programme in Supra-organizational Systems," Electronic Markets—The International Journal, Oct. 1993, 2 pages, vol. 3, No. 3.

Clemons et al., "Evaluating the prospects for alternative electronic securities markets," Proceedings of the twelfth international conference on information systems, New York, New York, United States, pp. 53-64, 1991.

FRIENDSTER.COM, homepage and "more info" pages, printed Apr. 29, 2004.

Google News archive search for "2Roam marketing" performed over the date range 2000-2003.

Google News archive search for "2Roam SMS" performed over the date range 2000-2008.

Grabowski et al., "Mobile-enabled grid middleware and/or grid gateways," GridLab—A Grid Application Toolkit and Testbed, Work Package 12—Access for Mobile Users, Jun. 3, 2003.

Graham, "The Emergence of Linked Fish Markets in Europe," Electronic Markets—The International Journal, Jul. 1998, 4 pages, vol. 8, No. 2.

Gunthorpe et al., "Portfolio Composition and the Investment Horizon," Financial Analysts Journal, Jan.-Feb. 1994, pp. 51-56.

Halperin, "Toward a Process Handbook for Organizational Coordination Processes," Electronic Markets—The International Journal, Oct. 1993, 1 page, vol. 3, No. 3.

Hess et al., "Computerized Loan Origination Systems: An Industry Case Study of the Electronic Markets Hypothesis," MIS Quarterly, Sep. 1994, pp. 251-275.

IBM, "Anonymous Delivery of Goods in Electronic Commerce," IBM Technical Disclosure Bulletin, Mar. 1996, pp. 363-366, vol. 39, No. 3.

IBM, "Personal Optimized Decision/Transaction Program," IBM Technical Disclosure Bulletin, Jan. 1995, pp. 83-84, vol. 38, No. 1.

IEEE 100—The Authoritative Dictionary of IEEE Standards Terms, Seventh Edition, 2000. Entire book; table of contents, source list, and terms beginning with A included. ISBN 0-7381-2601-2.

Ives et al., "Editor's Comments MISQ Central: Creating a New Intellectual Infrastructure," MIS Quarterly, Sep. 1994, p. xxxv.

Klein, "Information Logistics," Electronic Markets—The International Journal, Oct. 1993, pp. 11-12, vol. 3, No. 3.

Klein, "Introduction to Electronic Auctions," Electronic Markets—The International Journal, Dec. 1997, 4 pages, vol. 7, No. 4.

Kubicek, "The Organization Gap," Electronic Markets—The International Journal, Oct. 1993, 1 page, vol. 3, No. 3.

Kuula, "Telematic Services in Finland," Electronic Markets—The International Journal, Oct. 1993, 1 page, vol. 3, No. 3.

Lalonde, "The EDI World Institute: An International Approach," Electronic Markets—The International Journal, Oct. 1993, 1 page, vol. 3, No. 3.

Lee et al., "Intelligent Electronic Trading for Commodity Exchanges," Electronic Markets—The International Journal, Oct. 1993, 2 pages, vol. 3, No. 3.

Lee et al., "Electronic Brokerage and Electronic Auction: The Impact of IT on Market Structures," Proceedings of the 29th Annual Hawaii International COnference on System Sciences, 1996, pp. 397-406.

Lee, "AUCNET: Electronic Intermediary for Used-Car Transactions," Electronic Markets—The International Journal, Dec. 1997, pp. 24-28, vol. 7, No. 4.

LIVE365 press release, "Live365 to Offer Opt-In Advertising on Its Website," Oct. 15, 2004.

London Business School, "Overture and Google: Internet Pay-Per-Click (PPC) Advertising Options," Mar. 2003.

M2 Presswire, "Palm, Inc.: Palm unveils new web browser optimised for handhelds; HTML browser offers high-speed web-browsing option," Mar. 13, 2002.

Malone et al., "Electronic Markets and Electronic Hierarchies," Communications of the ACM, Jun. 1987, pp. 484-497, vol. 30, No. 6.

Mansell et al., "Electronic Trading Networks: The Route to Competitive Advantage?" Electronic Markets—The International Journal, Oct. 1993, 1 page, vol. 3, No. 3.

Mardesich, "Onsale takes auction gavel electronic," Computer Reseller News, Jul. 8, 1996, pp. 2, 32.

Marteau, "Shop with One Click, Anywhere, Anytime," Information Management and Consulting, 2000, pp. 44-46, vol. 15, No. 4.

Massimb et al., "Electronic Trading, Market Structure and Liquidity," Financial Analysts Journal, Jan.-Feb. 1994, pp. 39-49.

Mcginity, "Build Your Weapon," PC Magazine, Apr. 24, 2011, printed from www.pcmag.com/print_article2/0,1217,a%253D3955,00.asp.

Meade, "Visual 360: a performance appraisal system that's 'fun,'" HRMagazine, 44, 7, 118(3), Jul. 1999.

"Mediappraise: Mediappraise Receives National Award for Web-based Technology That Enables Companies to Solve Thorny HR Problem," Dec. 14, 1998.

Medvinsky et al., "Electronic Currency for the Internet," Electronic Markets—The International Journal, Oct. 1993, 2 pages, vol. 3, No. 3.

METAILS.COM, www.metails.com homepage, printed Oct. 13, 2004.

Microsoft Computer Dictionary, Fifth Edition, front matter and p. 33.

Microsoft Computer Dictionary, Fifth Edition, front matter, back matter, and pp. 479, 486.

Neches, "Fast—A Research Project in Electronic Commerce," Electronic Markets—The International Journal, Oct. 1993, 4 pages, vol. 3, No. 3.

Neo, "The implementation of an electronic market for pig trading in Singapore," Journal of Strategic Information Systems, Dec. 1992, pp. 278-288, vol. 1, No. 5.

\* cited by examiner

Fig. 2
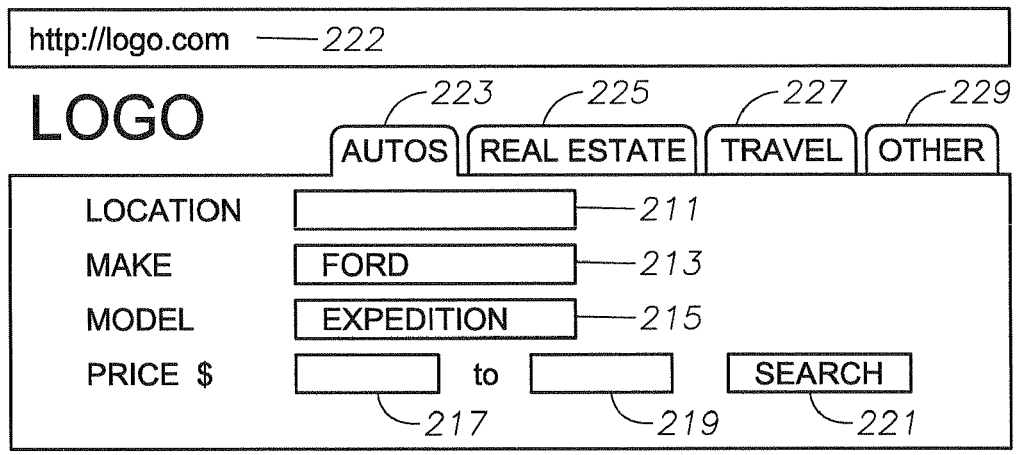
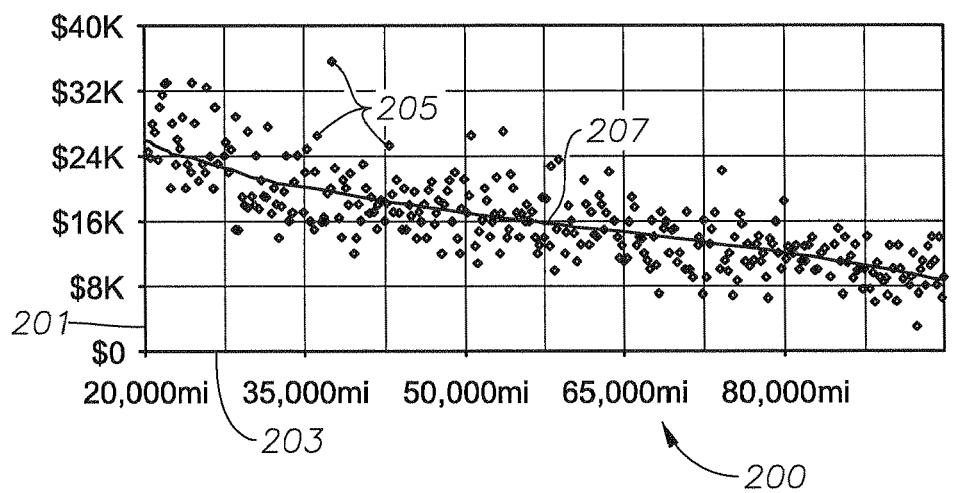
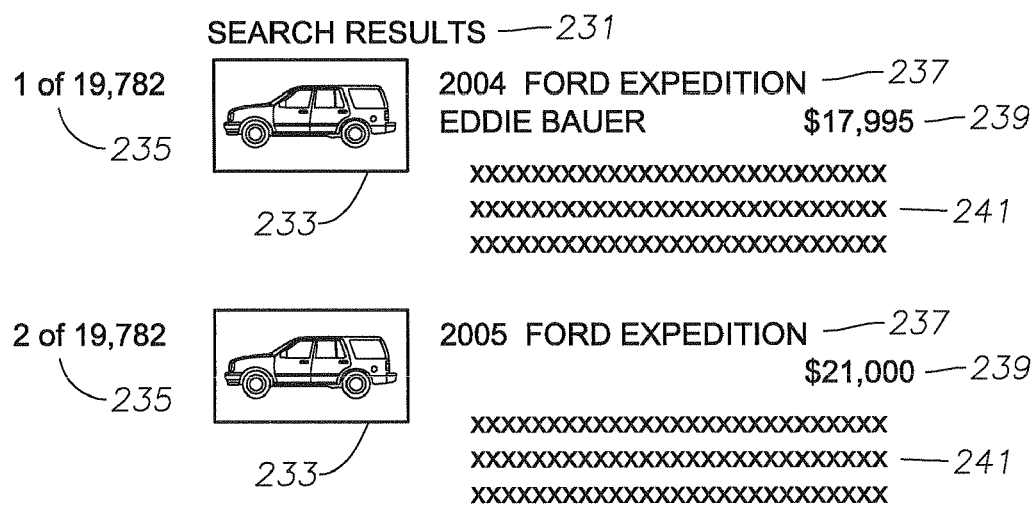

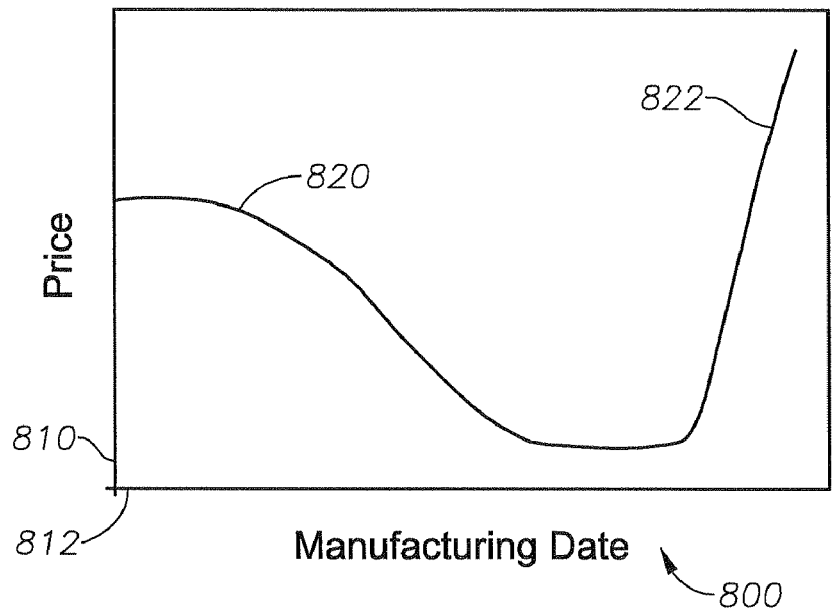

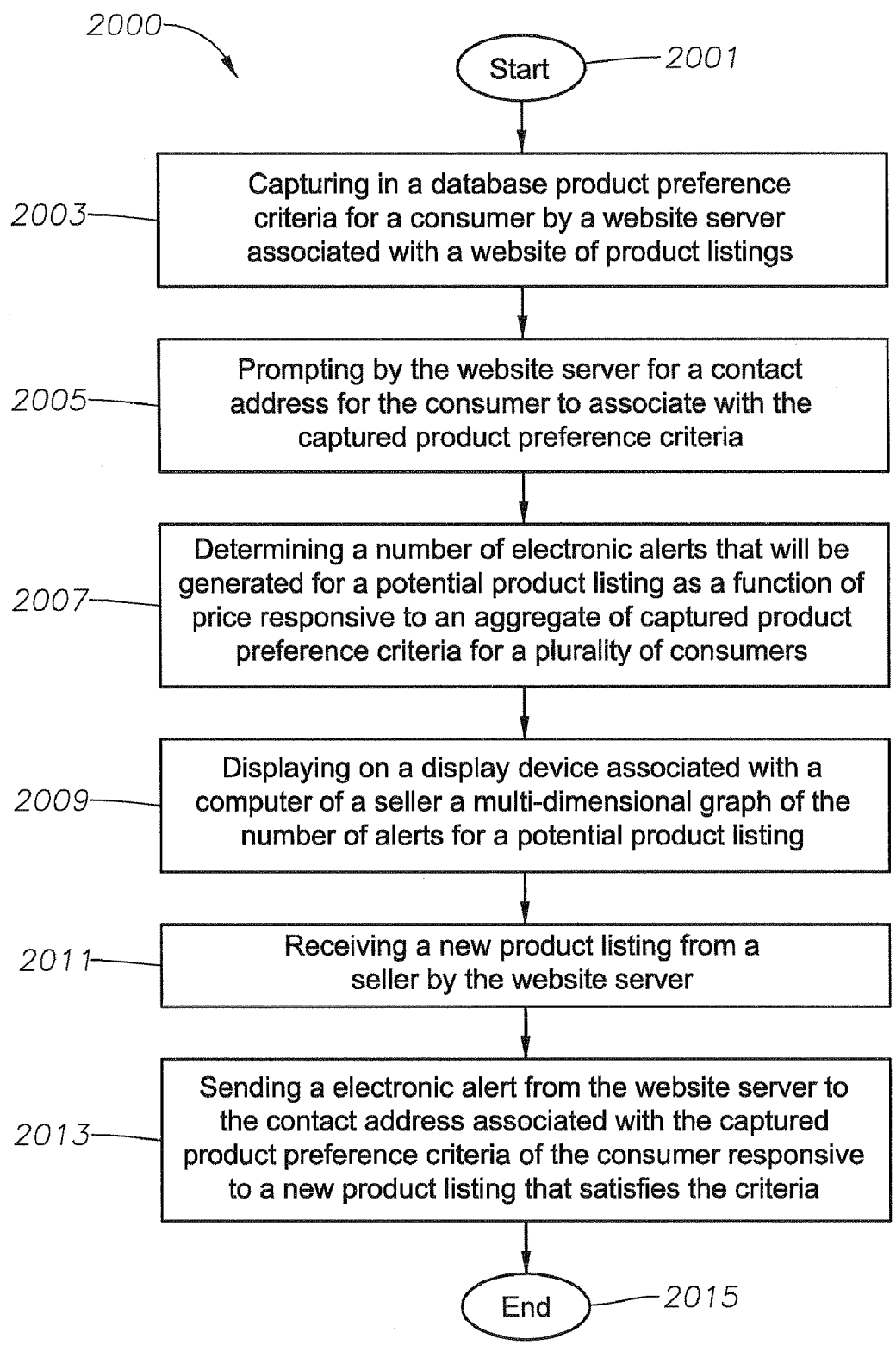

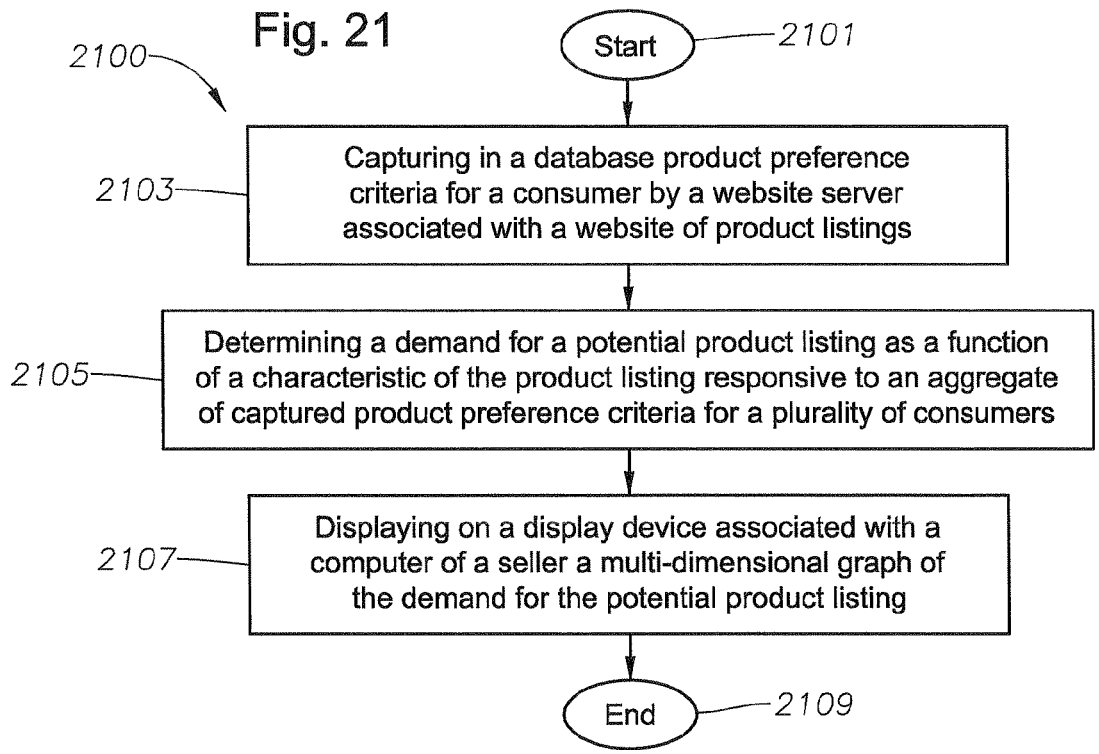
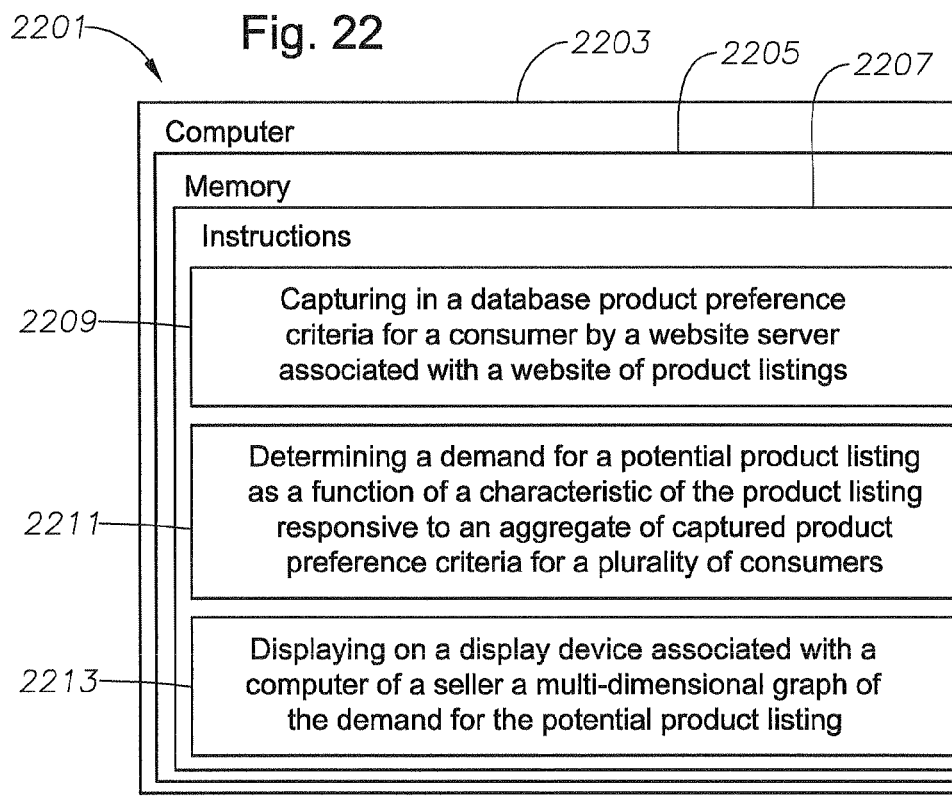

POSITIONING E-COMMERCE PRODUCT RELATED TO GRAPHICAL IMPUTED CONSUMER DEMAND

CROSS-REFERENCE TO RELATED APPLICATIONS

This application claims the benefit of U.S. Provisional Application No. 61/073,590, filed Jun. 18, 2008, and claims the benefit of U.S. Provisional Application No. 61/090,366, filed Aug. 20, 2008, which are hereby incorporated by reference herein in their entireties, including but not limited to those portions that specifically appear hereinafter, the incorporation by reference being made with the following exception: In the event that any portion of the above-referenced applications is inconsistent with this application, this application supercedes said above-referenced applications.

STATEMENT REGARDING FEDERALLY SPONSORED RESEARCH OR DEVELOPMENT

Not Applicable.

BACKGROUND

1. Field of Invention

The present invention relates generally to the electronic commerce through communication networks, and, more particularly, to computer program products, systems, and associated methods relating to representing consumer product preference criteria.

2. Background

The best deals often do not last long. The best deals usually have a relatively low price because the seller wants to sell the item quickly. In the electronic commerce industry, a "best deal" item is posted and typically sells very quickly; by the time many consumers find the listing or next check the electronic commerce website, the item has already sold. As a result, when searching for a deal on a product, including, for example, automobiles and consumer electronics, some consumers frequently monitor an electronic commerce website, unnecessarily and often unproductively consuming computer resources for the consumer as well as the electronic commerce website.

Merchants can use alerts to announce specials and promotions, including, for example, daily e-mails. Merchants can also use market segmentation to direct different alerts to different market segments based on demographics of the recipients, including age and geography. For example, consumers in one zip code may receive a different promotional e-mail alert than consumers in another zip code, and teenagers may receive different promotional e-mail alerts than senior citizens. Yet these approaches are typically driven by supply as opposed to demand. A demand-based approach, for example, can limit the promotional e-mails to consumers that have expressed interest in the particular product of the promotion.

Sellers, particularly post-retail sellers, such as, e.g., a private seller of a used car, often rely on published pricing guides, e.g., the KELLEY BLUE BOOK guide for vehicles, and advertisements for similar products in order to determine a selling price, rather than the actual market demand data. As a result, for example, sellers often set too high a price, so that the item fails to sell in the desired timeframe, or too low a price, so that the seller fails to receive a market price and leaves money on the table. The seller also doesn't have insight into where the demand falls and at what price. By understanding the price at which the demand increases, the seller could price and sell their product more quickly.

Likewise, by understanding characteristics of product listings at which demand increases, sellers could better position and sell their products.

SUMMARY OF INVENTION

In view of the foregoing, Applicants have recognized a need for and addressed problems associated with notification computer program products, systems, and methods to alert a consumer to the availability of new product listings for a product satisfying the consumer's criteria. Furthermore, Applicants have recognized a need for simplicity in the notification interface and have identified sources of problems associated with email notifications issues. Applicants have also recognized one or more sources of problems in the availability of only limited resources to a seller, particularly post-retail sellers, such as, e.g., a private seller of a used car, to gauge actual market demand in order to best position a product to sell or to determine a selling price for a product. Applicants have further recognized the need by sellers for a graphical representation of demand for a product.

Example embodiments provide notification program products, systems, and methods where the criteria for notification are easily selected by a consumer, so that the consumer can be made aware of an existence of a new product listing almost immediately in a convenient manner. The notification can include e-mails, text messages, pager messages, faxes, computer desktop widget applications, mobile widget applications, and other automated electronic messages generated by a website server. To select the criteria for notification, for example in an embodiment, a website server provides a consumer computer with a website including a web page with a two-dimensional or multi-dimensional graph of product listings. The website server captures product preference criteria of a consumer through a drag-and-drop interface on the displayed graph of product listings, and then prompts for a contact address, e.g., an e-mail address, for the consumer to associate with the captured product preference criteria. After a selected time period, the website server sends an electronic alert to the contact address associated with the captured product preference criteria of the consumer, responsive to a new product listing satisfying the criteria.

That is, according to example embodiments, a consumer is shown a two-dimensional or other multi-dimensional graph of product listings, including, for example, a graph of price versus mileage for a type of vehicle. The consumer will also have the ability to narrow the results already shown on the graph by various refinements. The consumer drags and drops a box on the graph to indicate product preference criteria, and then enters, for example, an e-mail address. When a new product is listed satisfying the consumer's criteria, the consumer is sent, for example, an e-mail alert.

Example embodiments can include various multi-dimensional pricing graphs. For example, embodiments can include graphs of price versus mileage for a vehicle. Embodiments also can include graphs of price versus model year, for example, for vehicles, and price versus year built, for example, for real estate. Embodiments also can include graphs of price versus dates associated with the product listings, for example, the price of an airline ticket or hotel stay versus the date of travel or the date of the stay. As understood by those skilled in the arts, a beach hotel may have seasonal pricing, with spring break and summer rates being substantially higher than fall and winter rates. Likewise, weekend travel rates may be substantially different than midweek rates.

Embodiments further can include graphs of price versus distance from the consumer. Transactions involving products that are expensive to ship relative to their price, for example, furniture, vehicles, and others as understood by those skilled in the art, can benefit from associating the product with a particular geographical area. Embodiments still further can include graphs of price versus the time the product listings have been on the market and other pricing graphs as understood by those skilled in the art.

Embodiments, for example, also can allow a consumer to click and drag on a multi-dimensional graph constituting a map to create a box that covers a particular geographical area. According to these embodiments, product listings can be associated with a geographical location, and the website server hosting the website of product listings, in additional to a contact address, can prompt the consumer for a preferred price range to augment the product preference criteria captured through the drag-and-drop interface. After a selected time period, responsive to a product listing satisfying the criteria, i.e., within the price range and within the geographic area of interest, the website server sends an electronic alert to the contact address associated with the captured product preference criteria of the consumer. Transactions involving products that do not generally move, for example, real estate, and alternatively products that are expensive to ship relative to their price, for example, furniture and vehicles, can benefit from associating the product with a particular geographical area as understood by those skilled in the art.

Other embodiments provide, for example, that a website, as understood by those skilled in the art, is freely accessible through an electronic communications network, e.g., the Internet, other global communications network, or home or office intranet, by the general public and available without specialized software application or paid subscription services so that sellers can have the largest possible market for their products. These embodiments operate without requiring consumers to provide identifying information (except for the contact address), to log-in to the website, or otherwise pay for a subscription or fee as understood by those skilled in the art. In a preferred embodiment, the website is a website of an electronic retailer. In another embodiment, the website gathers information for product listings from other websites. In yet another embodiment, the website is an auction website, and the product listings include items being auctioned.

Example embodiments also advantageously address the problem of sellers, particularly post-retail sellers, such as, e.g., a private seller of a used car, having limited resources to gauge demand for their products as a function of a characteristic of the product listing, including price, model year for a vehicle, mileage for a vehicle, age, quality, location, and other attributes as understood by those skilled in the art. According to example embodiments, multiple consumers' criteria can be aggregated and shared with sellers. Embodiments can include, for example, two-dimensional or multi-dimensional graphs plotting a number of alerts, i.e., demand, as a function of a characteristic of the product listing, including, for example, price, model year for a vehicle, and others as understood by those skilled in the art. Embodiments can also include contour lines for a number of alerts, i.e., demand, on a two-dimensional or multi-dimensional graph containing price information and one or more other attributes of a product listing, including, for example, mileage for a vehicle or model year for a vehicle. Embodiments can further include "heat maps" for demand, in which demand is color-coded onto a two-dimensional or multi-dimensional graph of price and one or more other attributes of a product listing. In addition, example embodiments can include displaying underlying data, or a portion of the underlying data, to a seller when a cursor associated with the seller hovers over a location of a graph or map. By allowing a seller to see imputed demand as a function of price, for example, sellers can more intelligently price their products. By allowing a seller to see imputed demand as a function of a characteristic of the product listing, for example, sellers can more intelligently position their products. That is, these embodiments allow sellers to conduct easy research into demand and target points where the largest numbers of willing and active consumers are looking. Because of the high volume of potential buyers that can be on-line or actively participating in e-commerce type transactions (or even just conducting product investigations) through the Internet or other communications networks as understood by those skilled in the art, the imputed demand box, curve, table or other data that can be generated to provide the potential seller relatively real time demand for price or other positioning of its product or service, e.g., pricing to sell the product where the most demand at a give price point or price range exists to sell a product more quickly, positioning the product at a less demand location to hone in on potential buyers that want a higher quality product than the product which potential buyers are willing to accept at a lower price, or other criteria or desires of a potential seller.

Example embodiments further provide a valuable marketing service to sellers by alerting consumers of an existence of a new listing satisfying their criteria. That is, embodiments provide notification to a quantifiable, built-in market for a seller's product, e.g., when a seller posts a product or otherwise announces that a product is available for purchase. In addition, example embodiments provide that an electronic alert can include an invitation for the consumer to access the product listing prior to the product listing being available generally to the public. That is, a special promotion code, a link to a restricted portion of the website, or other similar approach as understood by those skilled in the art can be included in the electronic alert so that consumers who shared product preference criteria with the website server can be given an opportunity to review a product listing prior to the general public, and perhaps purchase the product prior to the general public.

Embodiments further provide, for example, for tracking interactions of the consumer with the website of the product listings to thereby derive product preference criteria for the consumer. As understood by those skilled in the art, a consumer can interact with a website of product listings using one or more of a menu, a computerized search, a form, a slider to thereby indicate a range, and a multi-dimensional graph of product listings. A consumer can begin a search for a vehicle, for example, by selecting on a menu tab indicating cars, automobiles, or vehicles. Then, the consumer can, for example, fill in a form indicating a make and model preference. Next, the consumer can, for example, use a slider to indicate a desired price range. The website server can derive product preference criteria from these interactions as understood by those skilled in the art. The website server can then prompt the consumer for a contact address to associate with the product preference criteria so that the consumer expressly confirms an interest in receiving an electronic alert regarding new product listings that satisfy the product preference criteria. After a selected time period, when displaying to a seller a multi-dimensional graph of demand for the product so that the seller can gauge market demand prior to listing a product for sale or so that the seller can more intelligently price the product, the website server can distinguish demand expressly confirmed by one or more consumers and unconfirmed demand derived by tracking interactions of one or more consumers.

Embodiments, for example, can utilize enhancements in graphical displays and search technologies to easily capture data from consumers and to efficiently provide sellers with aggregate consumer demand information.

To a consumer, benefits of example embodiments can include being notified of new product listings that satisfy the consumer's criteria or are within a preselected range of the consumer's criteria. As a result, consumers do not need to diligently monitor the product listing website in order to find a "best deal" product, saving both time and computer resources. Benefits of example embodiments can include turning shopping for a particular product from an active process into a passive process. Furthermore, benefits of embodiments can include, for example, an opportunity for a consumer to access a new product listing prior to the general public. In addition, such targeted alerts have the potential to reduce other less effective means of advertising, including junk mail and cold calls. Also, by using an otherwise anonymous contact address, for example, a free e-mail address used only for limited purposes, as understood by those skilled in the art, a consumer can indicate product listing preferences without raising privacy concerns.

To a seller, benefits of example embodiments can include, for example, access to consumers that have expressed interest in the seller's product at the seller's price point or other demand criteria through electronic alerts. Example embodiments allow for positioning an e-commerce product related to graphical imputed consumer demand. In addition, example embodiments advantageously provide sellers an informative look into at what price they would need to list their product in order to generate demand, increase demand, or otherwise sell their product more quickly. Sellers will know that by listing a product with a given characteristic, including, for example, price or mileage, that X number of alerts will be sent out to interested consumers, as opposed to Y number of alerts with a different characteristic. Alternately, a seller will know that X' number of consumers have inquired (although did not request to receive electronic alerts) about a product with a given characteristic, including, for example, price or mileage, as opposed to Y' number of consumers at, for example, a different price or mileage.

To a product listing website, benefits of embodiments can include, for example, increased sales velocity by providing added benefits to consumers looking for great deals and by helping sellers to price or position their products correctly to sell them quickly.

Example embodiments provide, for example, a method, e.g., a computerized method, of alerting a consumer of an existence of a new product listing. The method may include displaying on a display device associated with a consumer computer a two-dimensional or other multi-dimensional graph of product listings on a web page from a website of product listings. The method may also include capturing product preference criteria of a consumer by a website server through a drag-and-drop interface on the displayed graph of product listings and prompting by the website server for a contact address for the consumer to associate with the captured product preference criteria. The method may further include sending an electronic alert from the website server to the contact address associated with the captured product preference criteria of the consumer responsive to a new product listing satisfying the criteria.

Example embodiments provide, for example, a method, e.g., a computerized method, of e-commerce. The method may include capturing in a database product preference criteria for a consumer by a website server associated with a website of product listings. The product preference criteria may include price information. The method may also include prompting by the website server for a contact address for the consumer to associate with the captured product preference criteria so that the consumer expressly confirms an interest in receiving an electronic alert regarding new product listings that satisfy the product preference criteria. The method may include determining a number of electronic alerts that will be generated for a potential product listing as a function of a characteristic of the product listing, including price, responsive to an aggregate of captured product preference criteria for a plurality of consumers. The method may further include displaying on a display device associated with a computer of a seller a multi-dimensional graph of the number of alerts, e.g., the demand, for the potential product listing so that the seller can gauge market demand prior to listing a product for sale and so that the seller can more intelligently price the product. The method may include receiving a new product listing from a seller by the website server and sending an electronic alert from the website server to the contact address associated with the captured product preference criteria of the consumer responsive to a new product listing that satisfies the criteria.

Example embodiments provide, for example, a system of alerting a consumer of an existence of a new product listing. The system may include a first computer associated with a website defining a website server. The website server is positioned to provide a website of product listings and to gather consumer product preference criteria. The system may also include a second computer associated with a consumer defining a consumer computer and a third computer associated with a seller defining a seller computer. The seller computer and the consumer are in communication with the website server through an electronic communications network; the seller computer is positioned to provide product listing information to the website server. The system may further include a computer program product stored in computer readable memory medium and operable on a computer associated with the website server as discussed below.

Example embodiments provide, for example, a computer program product, stored on a tangible computer readable memory media, operable on a computer, the computer program product comprising a set of instructions that, when executed by the computer, cause the computer to perform various operations. The operations may include providing a two-dimensional or other multi-dimensional graph of product listings on a web page from a website of product listings so that the two-dimensional or multi-dimensional graph of product listings is displayed on a display device associated with a consumer computer. The operations may also include capturing product preference criteria of a consumer by a website server through a drag-and-drop interface on the displayed graph of product listings and prompting by the website server for a contact address for the consumer to associate with the captured product preference criteria. The operations may further include sending an electronic alert from the website server to the contact address associated with the captured product preference criteria of the consumer responsive to a new product listing satisfying the criteria.

In addition, example embodiments may include other systems, program products, and associated methods alerting a consumer of an existence of a new product listing, as will be understood by those skilled in the art, and allowing a potential seller to receive and view imputed demand data, for example, for positioning of products or services in or through an electronic commerce network.

BRIEF DESCRIPTION OF DRAWINGS

So that the manner in which the features and benefits of the invention, as well as others which will become apparent, may be understood in more detail, a more particular description of the invention briefly summarized above may be had by reference to the embodiments thereof which are illustrated in the appended drawings, which form a part of this specification. The drawings illustrate only various embodiments of the invention and are therefore not to be considered limiting of the invention's scope as it may include other effective embodiments as well.

FIG. 2 is a web page according to an example embodiment;

FIG. 8 is a two-dimensional pricing graph for an object displaying price versus manufacture date according to an example embodiment;

FIG. 9 is a screenshot for a prompt for an electronic address according to an example embodiment;

FIG. 20 is a flow diagram of a method of e-commerce according to an example embodiment;

FIG. 21 is a flow diagram of a method of e-commerce according to an example embodiment; and FIG. 22 is a schematic diagram of a computer program product according to an example embodiment.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

Applicants, for example, have recognized a need for notification computer program products, systems, and methods to alert consumers to the availability of best deals for a product. Applicants have particularly recognized a need for simplicity in the notification interface. Applicants have also recognized one or more sources of problems in the availability of only limited resources to a seller, particularly post-retail sellers, such as, e.g., a private seller of a used car, to gauge actual market demand in order to best position a product to sell or to determine a selling price for a product.

Figure 1:
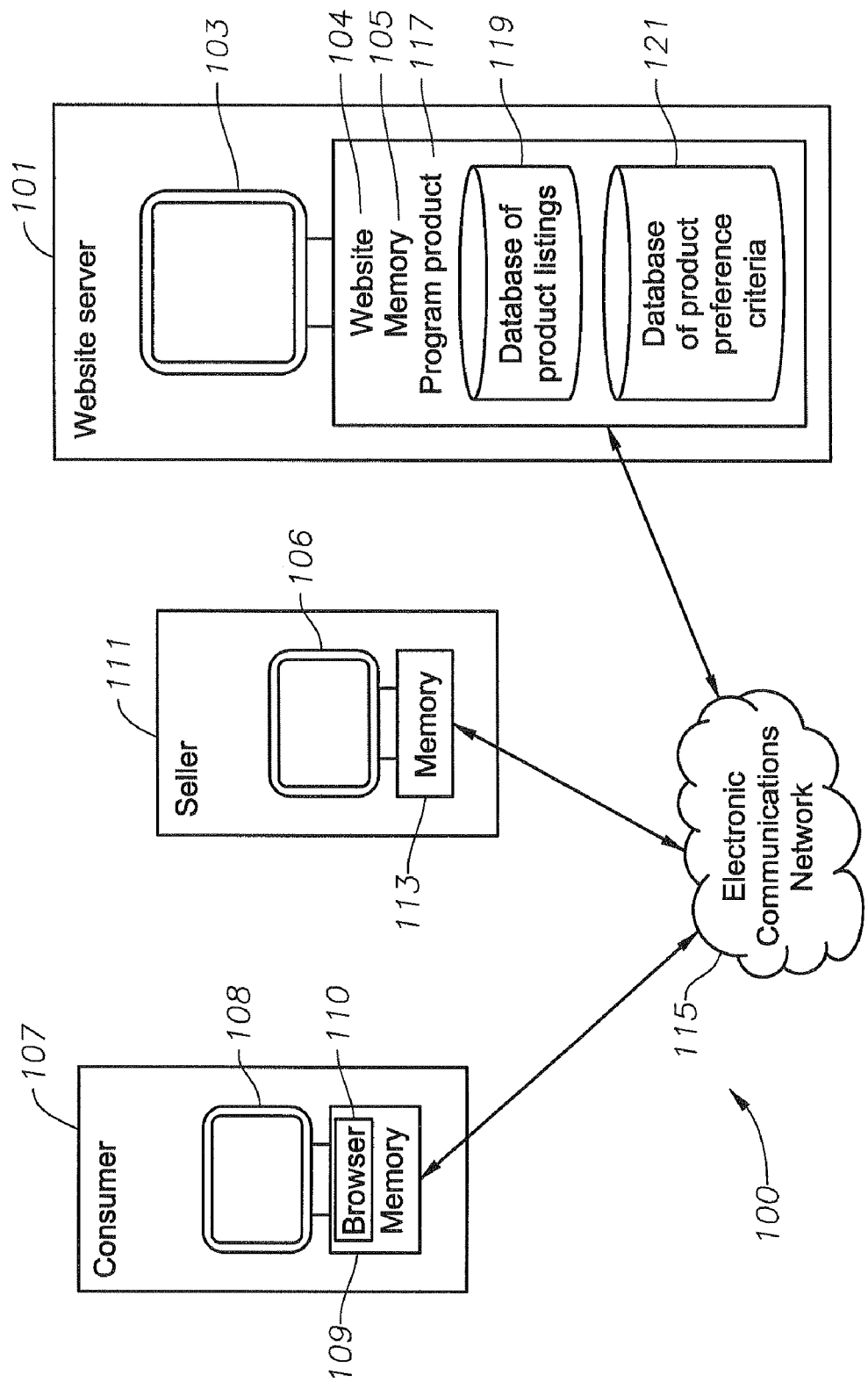
FIG. 1 is a schematic diagram of a system according to an example embodiment.

As illustrated in FIG. 1, for example, embodiments of a system, methods, and program products can utilize the Internet, which is an electronic communications network 115 that connects computer networks and computer facilities around the world as understood by those skilled in the art. The World Wide Web is a part of the Internet accessed through a graphical user interface and containing documents, including web pages, often connected by hyperlinks. A graphical user interface, as understood by those skilled in the art, is a computer program often stored on each of a consumer computer 107 and a seller computer 111 and designed to allow a computer user to interact easily with the computer typically by making choices from menus or groups of icons (see, e.g., FIG. 2). A graphical user interface is also often used in conjunction with a computer mouse, a computer keyboard, or similar devices. A computer mouse, for example, as understood by those skilled in the art, is a small mobile manual device that controls movement of a screen or display cursor and selection of functions on a computer display. The user uses the computer mouse to control the cursor within the display device. A hyperlink, for example, as understood by those skilled in the art, is an electronic link providing direct access from one distinctively marked place in a hypertext or hypermedia document to another in the same or a different document, usually associated with a website, such as hosted by a website server 101 (see, e.g., FIG. 1). A browser, for example, as understood by those skilled in the art, is a computer program usually stored on each of a consumer computer 107 and a seller computer 111 to enhance access to the Internet and to allow browsing of websites and web pages at website locations or information on a network, including websites on the World Wide Web. A website, as understood by those skilled in the art, is one or more web pages or a collection of web pages, both static and dynamic, that is hosted on a web server that is typically published online through the World Wide Web or the Internet so that others can access and view the web pages often through a browser or browsing software associated with their computer, including mobile and other electronic computer type devices. In dynamic web pages, for example, the content (text, images, form fields, etc.) on a web page can change in response to different contexts or conditions, including user interaction. In a static web page, for example, the content is often the same in response to all download requests from all users. Corporations, governments, educational institutions, organizations, individuals, businesses, and others, as understood by those skilled in the art, publish websites for advertising, informational, educational, transactional, and other purposes. Users typically view web pages for these websites on a display device associated with a user computer running a browser application as noted.

A drag-and-drop interface, for example, is a specific type of graphical user interface that supports the action of creating various types of associations between abstract objects. For example, a drag-and-drop interface can support a user clicking on a file and dragging the file on top of a folder to store the file within the folder. A drag-and-drop interface can require a user to click on an object and continue to hold down the mouse button (or button on a similar device) to grab the object, then drag the object to the desired location by moving the mouse (or similar device), and then drop the object by releasing the mouse button (or button on a similar device). This drag-and-drop interface often makes it easier for a user to visualize the movement of a file, document, photo, or other stored information to a desired location for storage and usually does not require writing a string of characters to designate an address or location for such storage or association. Alternately, a drag-and-drop interface can support the selection of objects amongst various objects, including objects displayed on a web page (see FIGS. 2-3). For example, a user can click on an icon within an application or on a web page to indicate a selection mode. The user then moves the cursor to a first desired location and clicks the button. The user then moves the cursor to a second desired location and clicks the button. The drag-and-drop interface can draw a rectangle, a box, or other shape, for example, with the two desired locations as opposite corners. The drag-and-drop interface selects the objects within the rectangle and also excludes the objects outside the rectangle, the box, or other shape, e.g., a circle, an oval, or designated pattern. By clicking and dragging the rectangle, for example, the user can change the location of the rectangle. By clicking and dragging on one of the edges of the rectangle, for example, the user can change the size of the rectangle. By changing the size or the location of the rectangle, for example, the user can alter the objects being selected so that the objects within the rectangle are included, and objects outside the rectangle are excluded. Next, once the rectangle is the size and location desired by the user, the user completes the selection of the objects by clicking on an icon, double-clicking on the rectangle, or through other means as understood by those skilled in the art. It will be understood by those skilled in the art that a drag-and-drop interface can also support the use of rectangles, boxes, circles, and other polygons, for example, to select objects on a web page. Advantageously, in the context of a web page, a drag-and-drop interface can visualize the association for the user by highlighting the selected object or objects, including, for example, by changing a color of the selected objects or objects.

An auction is a type of sales transaction in which the sale of property generally goes to the highest bidder. An online auction website, for example, as understood by those skilled in the art, is an auction where the bidding takes place through the Internet or the World Wide Web. A seller provides information about the seller and a product being auctioned to the online auction website. The online auction website, for example, publishes information about the seller and the product being auctioned then conducts the auction. Typically, the bidder with the highest bid at the completion of the auction wins the auction and purchases the product, and some auctions sites have features which allow quick purchase of an item at a seller set price. Payment, for example, can be made by the bidder directly to the seller, who ships the goods to the highest bidder and often pays the online auction house a commission.

A retailer is a business that sells, often in small quantities, directly to the ultimate consumer. An electronic retailer or an electronic commerce ("e-commerce") retailer, for example, as understood by those skilled in the art, is a business that sells directly to the ultimate consumer or other businesses using the Internet or the World Wide Web to facilitate all or a significant portion of the transaction. Often, a common carrier, such as the UNITED STATES POSTAL SERVICE, FEDERAL EXPRESS, or UNITED PARCEL SERVICE delivery service, completes the transaction by shipping the goods to the consumer from the electronic retailer. Typically, a website of an electronic retailer, for example, acts as a catalog for the goods, services, or goods and services ("products") being offered by the electronic retailer, allowing consumers to shop, to read descriptions of products, to compare prices, and to order products. In addition to providing products to consumers from manufacturers, service providers, or distributors, an electronic retailer can also provide a forum for individual sellers to offer products. In effect, the electronic retailer acts as a sales agent for the sellers.

Advantageously, an online auction website and an electronic retailer website, for example, can be freely accessible through an electronic communications network, e.g., the Internet, other global communications network, or home or office intranet, to the general public and available without specialized software application or often without paid subscription services so that sellers can have the largest possible market for their products.

By incorporating the technologies and features of the Internet and the World Wide Web, for example, electronic retailers advantageously provide consumers with a shopping environment superior to traditional brick-and-mortal retail in many ways. An electronic retailer, for example, is able to provide extensive information about product listings in an organized and convenient manner, including more detailed information than is typically available in a traditional retail environment. In addition, for example, a website of an electronic retailer is advantageously able to use search technology to help consumers find desired products more quickly than in a traditional retail environment.

A search engine, as understood by those skilled in the art, is computer software used to search data (as text or a database) for specified information. Consumers often use Internet search engines and search technology to explore the World Wide Web as a whole, but also use more localized or more expansive search engines to find data or information on and within web pages of a particular website. As understood by those skilled in the art, search results can be under-inclusive and over-inclusive. Under-inclusive results fail to include, or miss, relevant results; over-inclusive search results include more results than are necessary or desirable. As understood by those skilled in the art, a user often refines search input parameters in an effort to achieve the desired results. Search results are typically presented in a table on a dynamic web page or web pages created in response to input search parameters, ideally with the most relevant results (as defined by the search engine) first. Often a table of particular search results spans several web pages.

Figure 5:
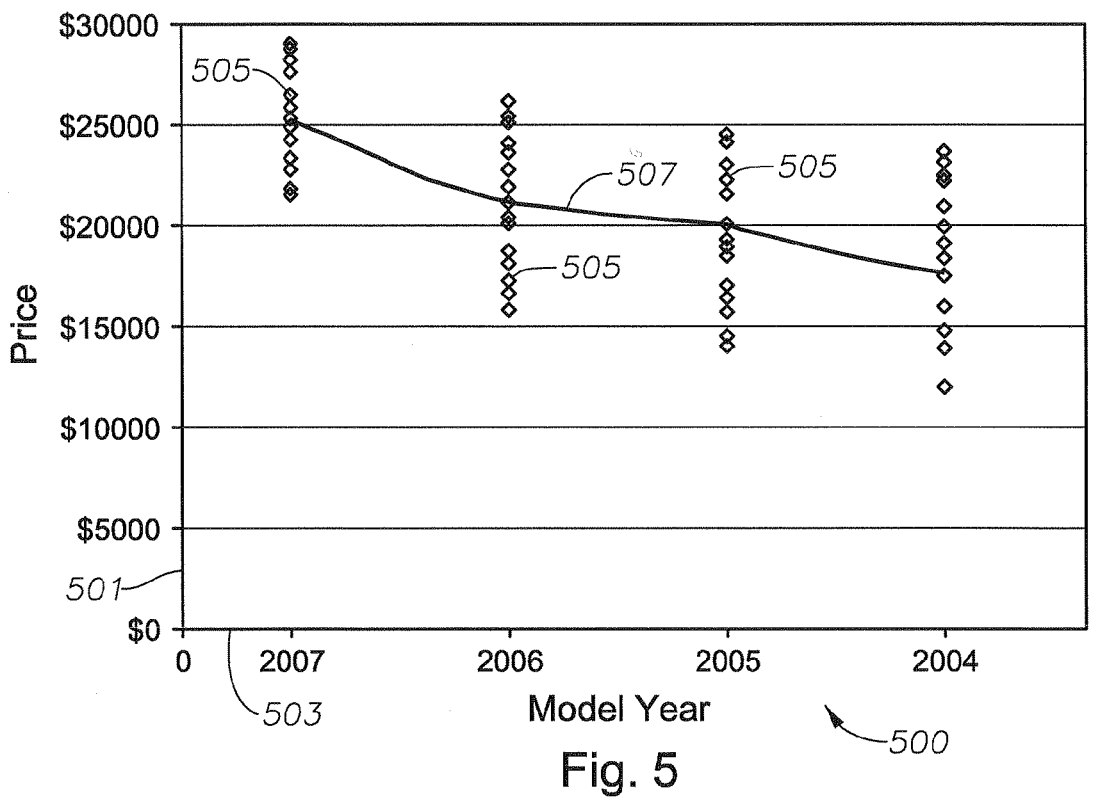
FIG. 5 is a two-dimensional graph of product listings for a vehicle displaying price versus model year according to an example embodiment.

Certain search results can be represented graphically, providing a user a visual representation of search results that can span several web pages. Advantageously, many search results associated with online auction websites or electronic retailers can often be represented graphically. For example, a consumer's search for a used FORD EXPEDITION vehicle from an electronic retailer website can result in thousands of individual results, spanning numerous web pages, as illustrated in an embodiment in FIG. 2. Advantageously, the electronic retailer website can graph the results as a function of price and as a function of mileage of the vehicles 200 or alternately by model years, as illustrated in FIG. 5. By displaying a graph of the search results as a function of price before the typical table of search results, the electronic retailer is advantageously able to provide a basic understanding of the product offerings for the consumer without the consumer having to view pages and pages of search results. For example, a best fit curve 207, as understood by those skilled in the art, can be superimposed on the graph of product listings.

Embodiments of systems, computerized methods, and program products can provide, for example, a website of product listings 104. The website 104 can be, for example, the website of an electronic retailer. Alternately, the website can be, for example, the website of an online auction provider. A website server is a computer 101 that hosts a website 104, which includes various web pages (see, e.g., FIG. 2). Embodiments can also include a consumer having a consumer computer 107. The consumer computer 107 can include memory 109, a display device 108, an operating system, and a browser application 110 stored in memory 109 of the computer 107. The consumer computer 107 and the website server 103 communicate through an electronic communications network 115, for example, the Internet, according to example embodiments. The website server 101 publishes the website 104 so that the consumer computer 107, as well as the seller computer 111, can display the website and its web pages, both static and dynamic, on the display device 108 associated with the consumer computer 107, or on the display device 106 on the seller computer 111.

The consumer, for example, enters an address 222 of the website of product listings into the browser, connects to the website of product listings through the browser by entering information in a search engine and then clicking on the results to link to the website of product listings, as understood by those skilled in the art, connects to the website of product listings through a directory, or otherwise navigates to the website of product listings. The consumer indicates at least some product preference information by various techniques, including clicking on a hyperlink to a product category through text or an icon, navigating to a category through a pull-down menu, entering one or more search parameters into a search engine, selecting a radial button, and others as understood by those skilled in the art. The consumer can also indicate further product preference information, including selecting a subcategory or further refinement. For example, the consumer can first indicate a desire for a sports utility vehicle, or SUV. Then the consumer can indicate interest in a FORD EXPEDITION vehicle. Alternately, the consumer can indicate a product preference for a FORD make of vehicle, then indicate an interest in an SUV, and then indicate interest in an EXPEDITION model of vehicle. As understood by those skilled in the art, the consumer can use a combination of data fields, pull-down menus, icons, and other techniques to find a desired product category or subcategory. For each navigation step by the consumer, the website server can provide the product listings that satisfy the preferred product criteria. The website server can also track the navigation pattern to create or derive consumer product preference criteria as will be understood by those skilled in the art.

Example embodiments provide, for example, for displaying on the display device 108 associated with the consumer computer 107 a two-dimensional or other multi-dimensional graph of product listings on a web page from a website of product listings. For example, a first axis of the two-dimensional graph can contain price information. A second axis of the two-dimensional graph can contain information for another attribute of the product listing, including, for example, mileage for a vehicle or model year for a vehicle (see FIGS. 5-6). Advantageously, the two-dimensional or other multi-dimensional graph presents an abundance of information regarding the product listings in a compelling and convenient format. Throughout this specification, the term multi-dimensional means having more than one dimension and generally includes but is not limited to two-dimensional. Additional embodiments can include superimposing a curve representing the best fit, as understood by those skilled in the art, on the two-dimensional or multi-dimensional graph.

Figure 3:
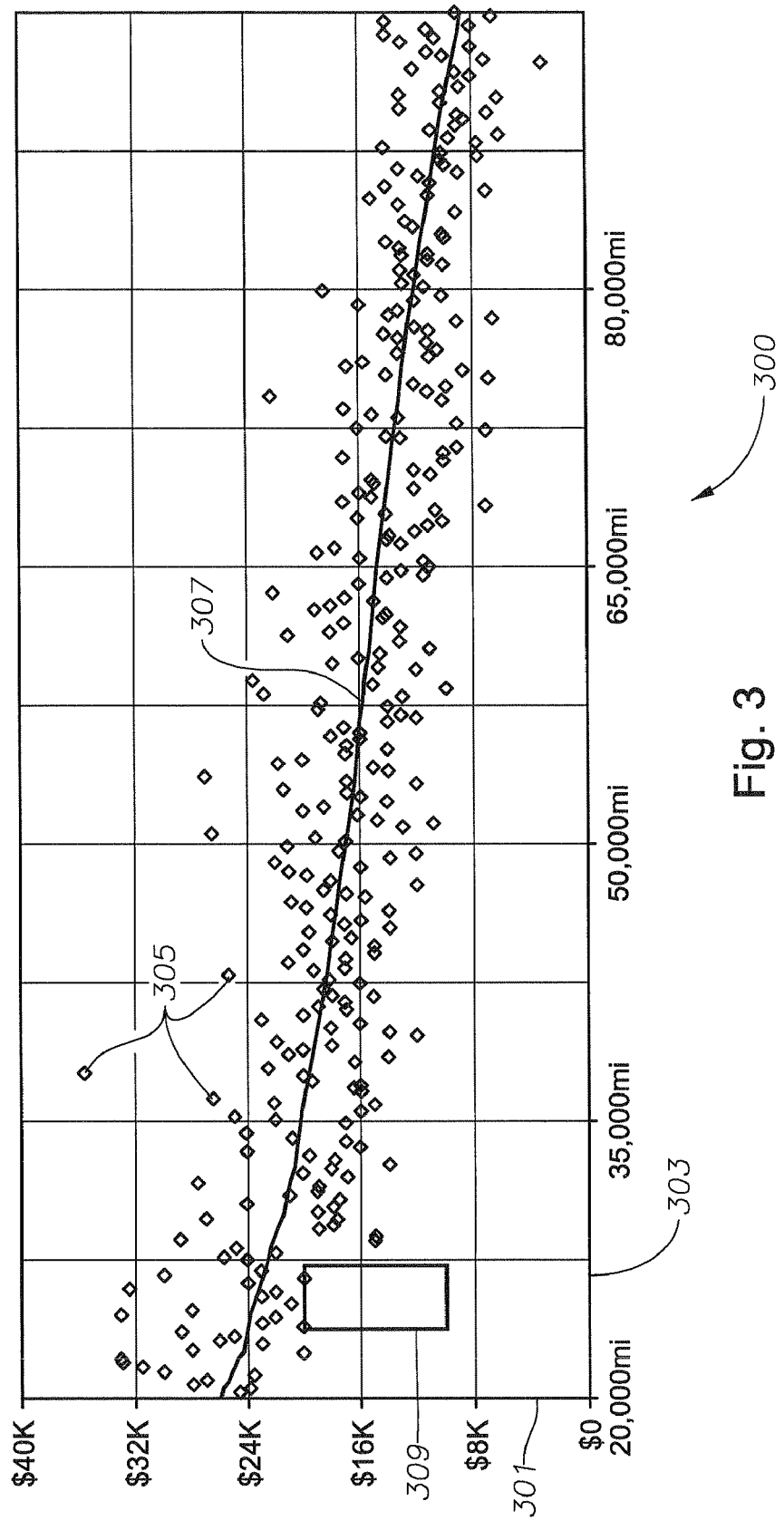
FIG. 3 is a two-dimensional graph of product listings for a vehicle displaying price versus mileage according to an example embodiment.

Example embodiments provide, for example, that the two-dimensional or multi-dimensional graph of product listings includes a drag-and-drop interface for receiving consumer product preference criteria. Next, example embodiments can include capturing product preference criteria of the consumer through the drag-and-drop interface on the displayed graph of product listings, as illustrated in FIG. 3. For example, the consumer can create through the drag-and-drop interface a box 309 indicating a preferred price range and a preferred range of the other attribute of the product listing, such as, a preferred range of mileage of the vehicle. The website server 101, for example, captures this preferred product criteria, as understood by those skilled in the art, including any product preference information used to generate the two-dimensional or multi-dimensional graphic. That is, the website server 101 captures that the consumer is interested in, for example, a used FORD EXPEDITION vehicle within a certain price range and also within a certain mileage range. Next, the website server 101 generates a prompt, a form, or a portion of web page displayed to the consumer and asking for an e-mail address for the consumer, as illustrated in an embodiment of such a prompt 900 in FIG. 9. The website server 101 presents the prompt 900 to the consumer, who fills in an e-mail address or other contact information as understood by those skilled in the art. The website server then stores the product preference criteria. In a preferred embodiment, for example, the website server 101 hosting the website of product listings contains a database of product listings 119 and a database of a plurality of stored product preference criteria for a plurality of consumers 121. The consumer can then continue to shop or leave the website of product listings, including logging off of the Internet or by exiting the browser 110 as will be understood by those skilled in the art.

Figure 15:
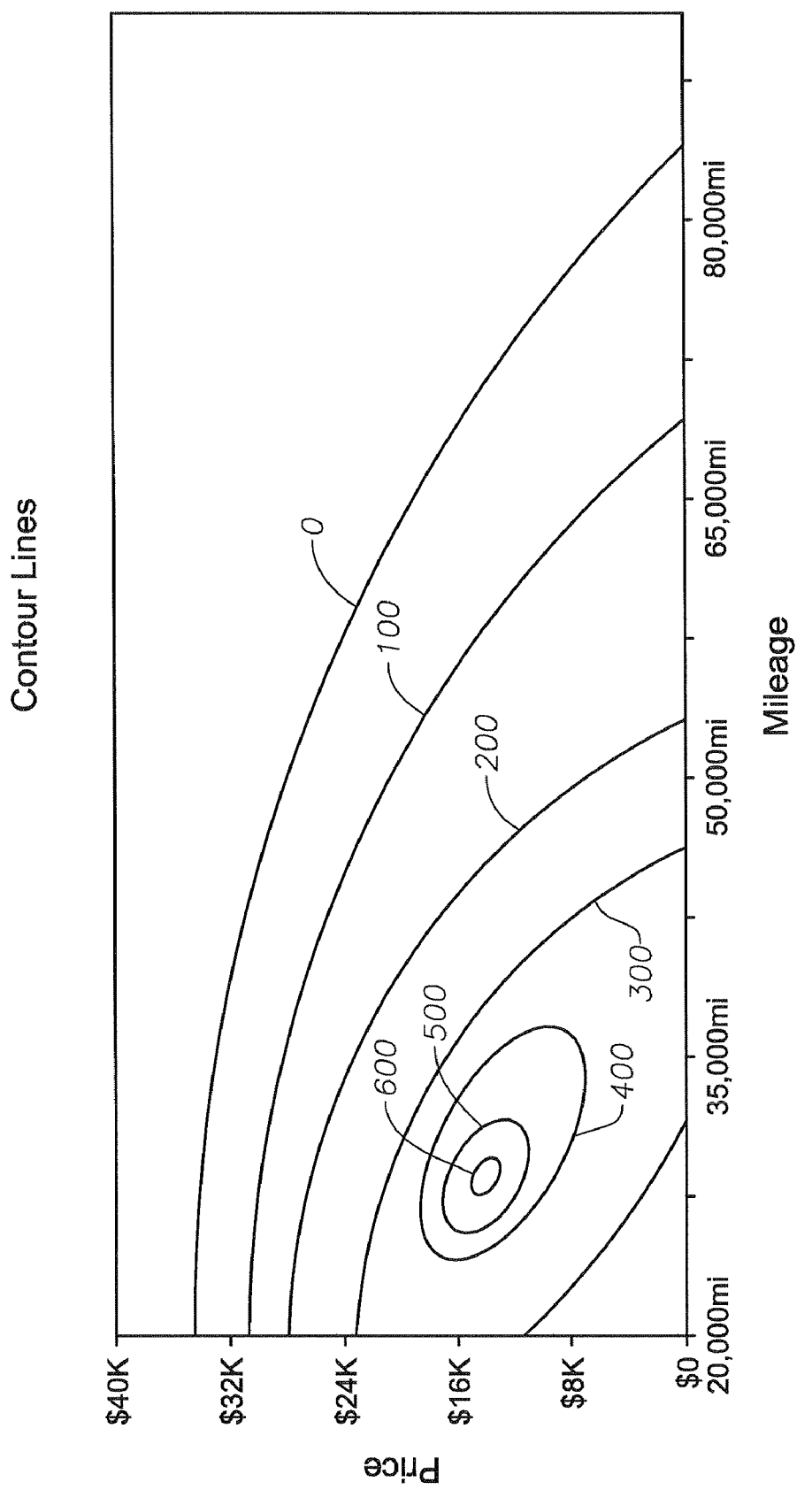
FIG. 15 is a plot of contour lines for a number of alerts imposed on a two-dimensional pricing graph according to an example embodiment.
Figure 16:
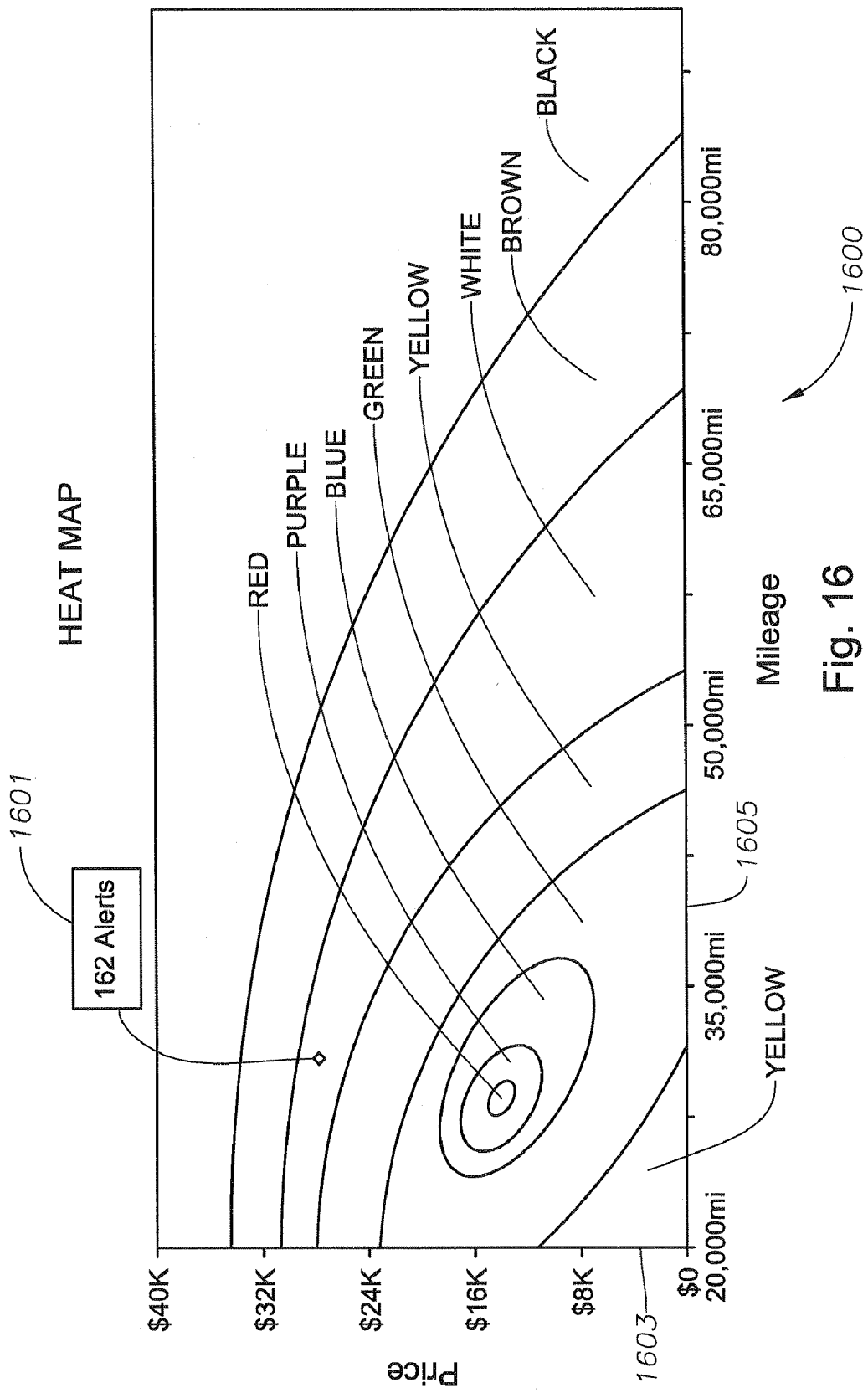
FIG. 16 is a heat map for a number of alerts imposed on a two-dimensional pricing graph wherein the number of alerts is color-coded according to an example embodiment.

Example embodiments can advantageously address the problem of sellers, particularly post-retail sellers, such as, e.g., a private seller of a used car, having limited resources to gauge demand for their products as a function of price. For example, multiple consumers' criteria can be aggregated, stored in a database 121, and shared with sellers. Example embodiments can include, for example, two-dimensional or other multi-dimensional graphs plotting imputed demand as a function of price (see, e.g., FIG. 4). Embodiments can also include, as illustrated in FIG. 15, contour lines for demand on a two-dimensional graph containing price information and another attribute of a product listing, including, for example, mileage for a vehicle. Embodiments can further include "heat maps" for a number of alerts, e.g., demand, as illustrated in FIG. 16 in which the number of alerts is color-coded onto a two-dimensional graph of price and another attribute of a product listing, including, for example, mileage for a vehicle. The contour lines and heat maps, for example, can allow a two-dimensional graph to, in essence, have a quasi-third dimension by adding a third feature, key, or data associated with the two dimensions. As understood by those skilled in the art, however, other multi-dimensional graphs such as three-dimensional (x, y, and z axis) or four or quasi-four dimensional (x, y, and z axis plus graph rotation in space) can also be used according to example embodiments. In a preferred embodiment, two-dimensional graphs are sufficient to display the necessary information to the seller (or alternately to the consumer) as two-dimensional graphs are simple, straightforward, and easy to understand. Other multi-dimensional graphs add complexity compared to two-dimensional graphs, which, if necessary to display the additional attribute is beneficial, but otherwise is cumbersome to the viewer.

Figure 19:
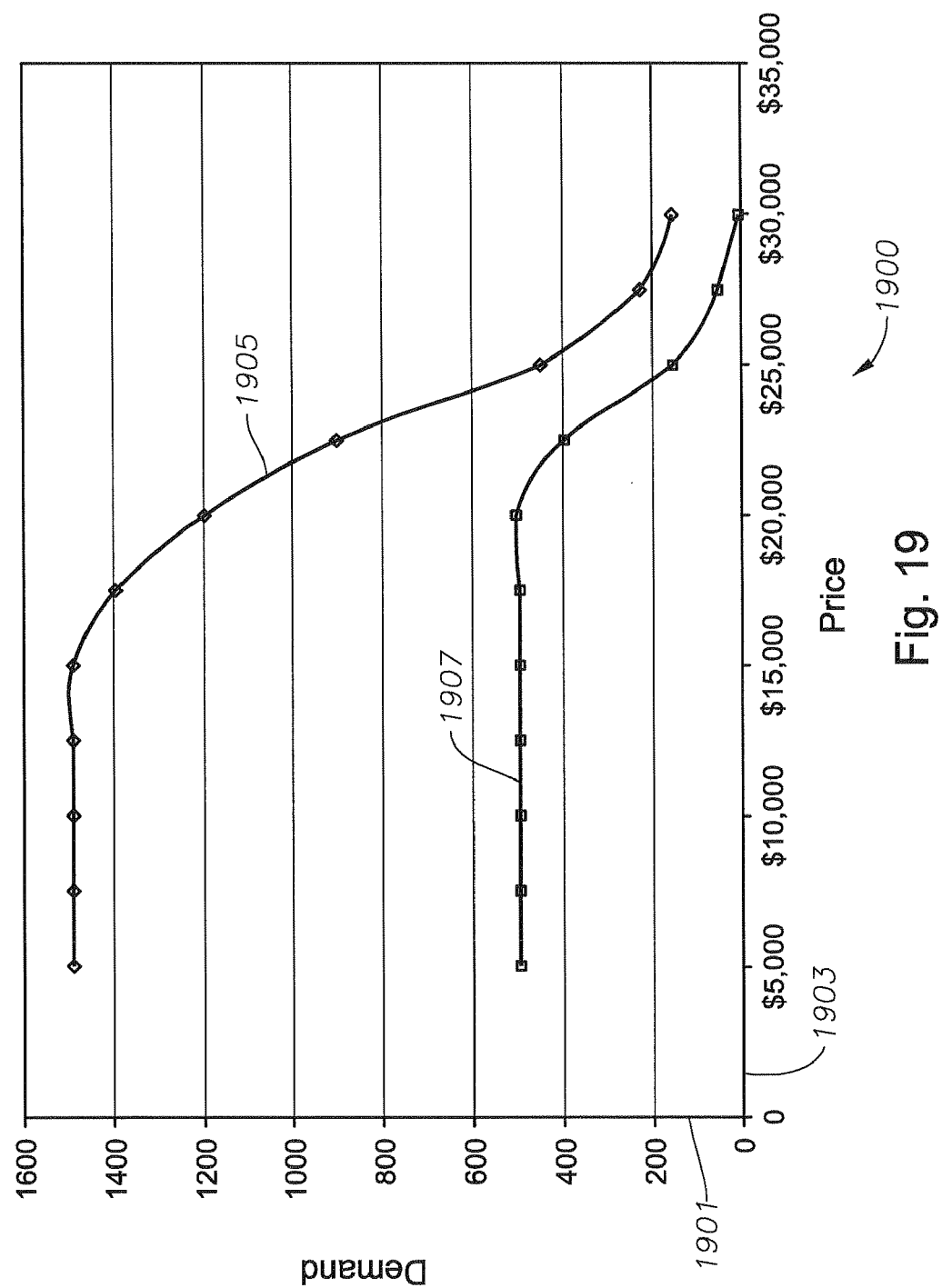
FIG. 19 is a graph displaying demand, confirmed and derived, versus price for a vehicle having certain attributes according to an example embodiment.

In a preferred embodiment, demand can be displayed on a display device associated with a seller computer as a multi-dimensional graph of imputed consumer demand for the product. As illustrated in FIG. 19, the display can include both and distinguish between demand expressly confirmed by one or more consumers as shown at 1907 and unconfirmed demand derived by tracking interactions of one or more consumers as shown at 1905. The confirmed demand 1907 corresponds to a consumer expressly indicating a willingness to receive an electronic alert. The unconfirmed demand derived by tracking consumer interactions 1905 corresponds to consumers whose menu selections, searches, and other behavior regarding the website of product listings indicate product preference criteria as understood by those skilled in the art; however, these consumers, for whatever reason, did not associate a contact address with the criteria.

In addition, embodiments can include, for example, displaying underlying data, or a portion of the underlying data, to a seller when a cursor associated with the seller hovers over a location of a graph or map 1601. By allowing a seller to see demand as a function of price, sellers can more intelligently price their products. By allowing a seller to see demand as a function of a characteristic of the product listing, for example, sellers can more intelligently position their products. That is, these embodiments can allow sellers to conduct easy research into demand and target points where the largest numbers of willing and active consumers are looking. Example embodiments can further provide a valuable marketing service to sellers by alerting consumers of the new listing satisfying their criteria. That is, embodiments can provide notification to a quantifiable, built-in market for a seller's product.

Example embodiments provide, for example, the seller to analyze the demand curve and to actively select a price position on a demand curve to thereby achieve a desired result. The process of selecting the price position can include, for example, selecting the maximum demand level so that the criteria of the largest possible number of interested consumers are satisfied to thereby induce a quick sale. The process of selecting the price position can include, for example, selecting the maximum price that corresponds to a predetermined minimum demand level, for example, a demand of at least 10 consumers, to thereby achieve large revenue to the seller while requiring a reasonable level of interest in the product. The process can also include, for example, selecting the maximum price that corresponds to a predetermined demand level, for example, a demand level that equates to 50% of the maximum possible demand level at any price to thereby achieve a desired balance between maximizing revenue for the seller and minimizing the time to sell the product. In addition, the process of selecting the price position on the demand curve can include a predetermined minimum price. Other approaches and methodologies will be recognized and understood by those skilled in the art, including sophisticated decision approaches involving profit maximizing functions, time minimizing functions, and demand statistics including standard deviations from a mean demand level. Next, the seller can evaluate the price position in view of the known offers or supply of product listings at the selected price position. That is, the seller can view the two-dimensional or other multi-dimensional graph of product listings ("supply curve") from the website server, including, for example, the graph of price versus mileage for a type of vehicle. The seller can then compare the seller's product to the other product listings at the selected price position. For example, at the selected price, the seller's vehicle can have lower mileage, additional or more desired features (such as, a stereo or navigation system), or better condition than the other similar vehicle product listings. The seller can then describe the product so as to distinguish the product from the other product listings, including, for example, as in great or mint condition. If not satisfied that the product compares favorably at the price position, the seller can further analyze the demand curve and to select a different price position as understood by those skilled in the art. Then the seller can submit a product listing to the website of product listings, including the description and selected price position, requesting the website to post the product listing. The seller can further submit a photograph, a scanned image, or other representation of the product, or its packaging, as understood by those skilled in the art. In addition, the website of product listings can require seller identity information and authorization, for example, as included in a seller's agreement. After the product listing has been posted by the website server, the seller can monitor the demand and supply curves, as well as individual product listings, to make adjustments in the price position or alter the product description during selected time periods.

According to example embodiments, the website server 101 can wait for the creation of a new product listing 305. A new product listing is then created when the seller chooses to list a product. The new product listing can be a product listing for an electronic retailer. Alternately, the new product listing can include a product being offered for auction on an online auction website. In addition, the new product listing can be a result of modifying a previous product listing, for example, setting a new lower price. The website server hosting the website of product listings can monitor the creation of a new product listing and compares the new product listing to captured product preference criteria, or preferably the plurality of stored product preference criteria. If the product preference criteria are satisfied, then an electronic alert, e.g., an e-mail alert, can be generated and sent to the address associated with the satisfied product preference criteria that the website server previously prompted for and stored.

E-mail alert embodiments can include, for example, a memo line with special or unique content identifying the alert as responsive to the product preference criteria, including product preference information or other signifier as understood by those skilled in the art, whether chosen by the consumer or the website server, to distinguish the notification of the new product listing from other e-mails or alerts, including promotions, offers, spam, and other advertisements, including other e-mails and alerts from the website provider. In addition, a special or unique e-mail address or other sender address, whose use is restricted to a notification program according to example embodiments, can distinguish the e-mail or other alerts responsive to product preference criteria of the consumer so that the notification is distinguished from other e-mails and alerts to thereby call attention to the consumer to the notification. These and other embodiments can, for example, advantageously minimize the impact of spam, junk mail, and any associated filters.

Electronic alerts embodiments can also include an invitation for the consumer to access the product listing prior to the product listing being available generally to the public. That is, a special promotion code, a link to a restricted portion of the website, or other similar approach as understood by those skilled in the art can be included in the electronic alert so that consumers who shared product preference criteria with the website server can be given an opportunity to review the product listing prior to the general public, and perhaps purchase the product prior to the general public. Advantageously, a restricted opportunity to purchase a product, limited in the sense of both time and the potential buyers, can foster a sense of urgency for the purchase, resulting in faster sales. In addition, the restricted opportunity can act as an inducement for a consumer to share product preference criteria with the website server.

Example embodiments provide program products, systems, and associated methods of alerting consumers of an existence of a new product listing. A website server, for example, can provide a website of product listing including a web page that displays a two-dimensional or other multi-dimensional graph of product listings. A first axis of the two-dimensional or other multi-dimensional graph can contain pricing information. A second axis of the two-dimensional or multi-dimensional graph can contain information for another attribute of the product listing, including, for example, mileage for a vehicle or model year for a vehicle. The website server can capture product preference criteria of a consumer through a drag-and-drop interface on the displayed graph of product listings and prompts for a contact address, e.g., an e-mail address, for the consumer to associate with the captured product preference criteria. After a selected time period, the website server can send an electronic alert to the contact address associated with the captured product preference criteria of the consumer responsive to a new product listing satisfying the criteria. The notification via an electronic alert can include e-mails, text messages, pager messages, faxes, computer desktop widget applications, mobile widget applications, and other automated electronic messages generated by a website server. That is, example embodiments can provide, for example, for a contact address including an e-mail address, a phone number, a pager number, an address associated with a computer desktop widget application, an address associated with a mobile widget application, and a fax number. Widgets are interactive virtual tools, specifically software applications that provide single-purpose or limited-purpose services such as showing the user the latest news, the current weather, the time, a dictionary, photo viewers, or other services as understood by those skilled in the art. Example embodiments can include computer desktop widget and mobile widget applications for a mobile telephone or wireless device.

Figure 4:
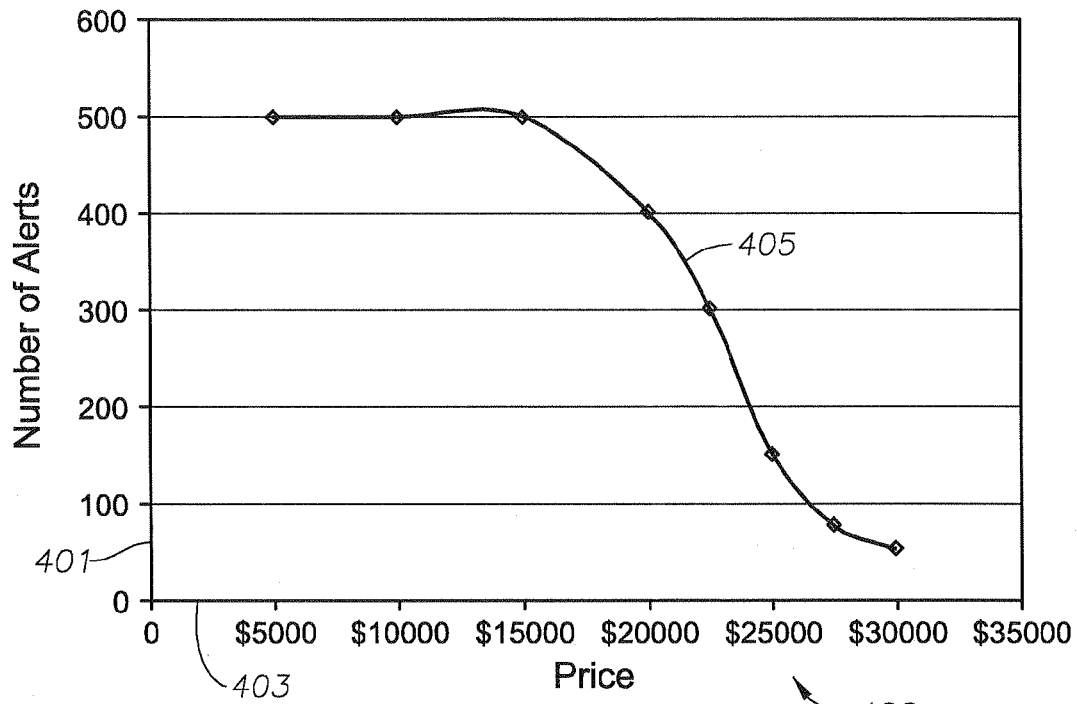
FIG. 4 is a two-dimensional graph displaying number of consumer alerts versus price for a vehicle having certain attributes according to an example embodiment.
Figures 10, 11:
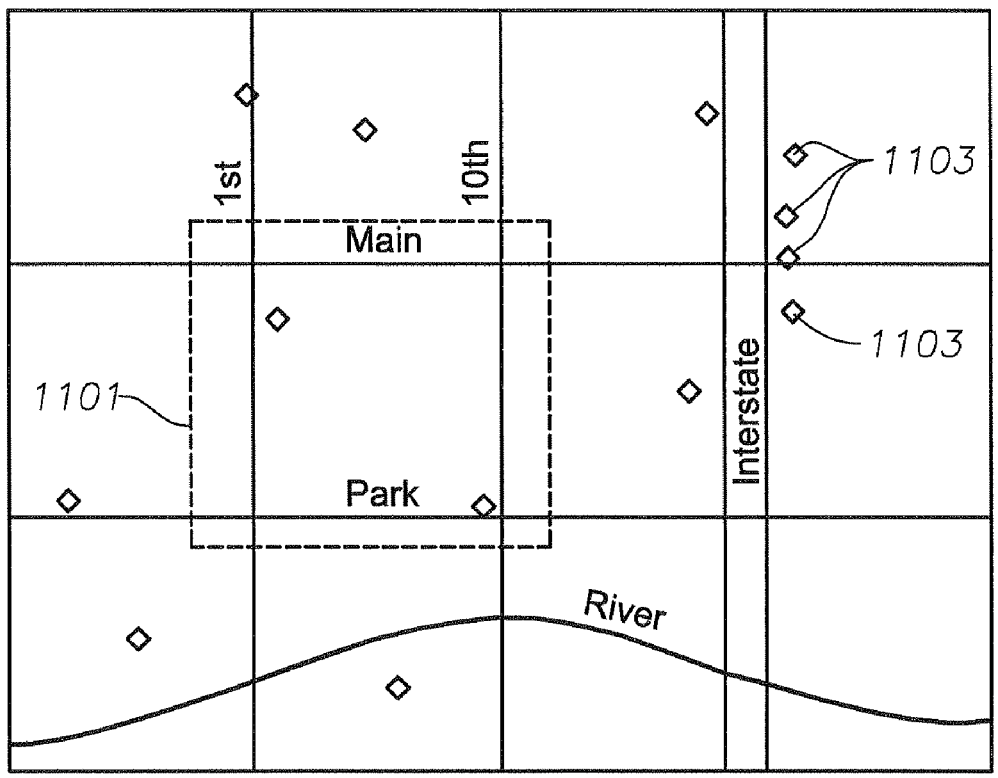
FIG. 10 is an example of an alert according to an example embodiment.
FIG. 11 is a two-dimensional map of product listings according to an example embodiment.

The following example illustrates example embodiments. Consumer C desires to find a deal on a used FORD EXPEDITION vehicle. Consumer C visits a website of product listings 220 for vehicles and selects information on product listings for a FORD EXPEDITION vehicle 213, 215. The website returns traditional search results 231 for various individual listings 235 as understood by those skilled in the art, but also displays a two-dimensional graph 200 of various FORD EXPEDITION vehicle product listings on the website, as illustrated in FIG. 2. The first axis 201 of the graph contains price information; the second axis 203 contains mileage information. Each data point 205 represents an individual product listing. As understood by those skilled in the art, a curve representing the best fit 207 can be superimposed on the two-dimensional graph 200. Then Consumer C can click on individual product listings to obtain further information, such as condition, color and other features, and location of the vehicle 241. In addition, as illustrated in FIG. 3, Consumer C can drag and drop a box onto the graph indicating search criteria, for example, a box 309 indicating a range of 23,000 to 27,000 miles with a price of $10.000 to $22,000. The product listings website captures the criteria and then prompts Consumer C for a contact address, such as, e.g., an e-mail address (see, e.g., FIG. 9). This prompt 900 can confirm the product preference criteria of the consumer as well. After a selected time period, Seller S desires to sell a FORD EXPEDITION vehicle with 25,000 miles and uses the product listings website for research on the demand of the product as a function of price. The product listing website 101 displays to Seller S a two-dimensional graph 400 of the number of alerts requested as a function of price for this product, the FORD EXPEDITION vehicle with 25,000 miles, as illustrated in FIG. 4. The y-axis 401 contains the number of alerts; the x-axis 403 contains the price of the product listing. Seller S learns various demand points, including that listing this product with a price of $10,000, for example, will generate 500 consumer alerts; listing this product with a price of $20,000 will generate 400 consumer alerts; and listing this product with a price of $22,500 will generate only 300 consumer alerts. Armed with this information, Seller S describes the product and lists the FORD EXPEDITION vehicle on the website with a price of $20,000. Responsive to this product listing, which satisfies the captured product preference criteria of Consumer C, the product listings website sends an e-mail alert 1000 of the new product listing by Seller S to the 400 consumers, including Consumer C, as illustrated in FIG. 10.

Figure 6:
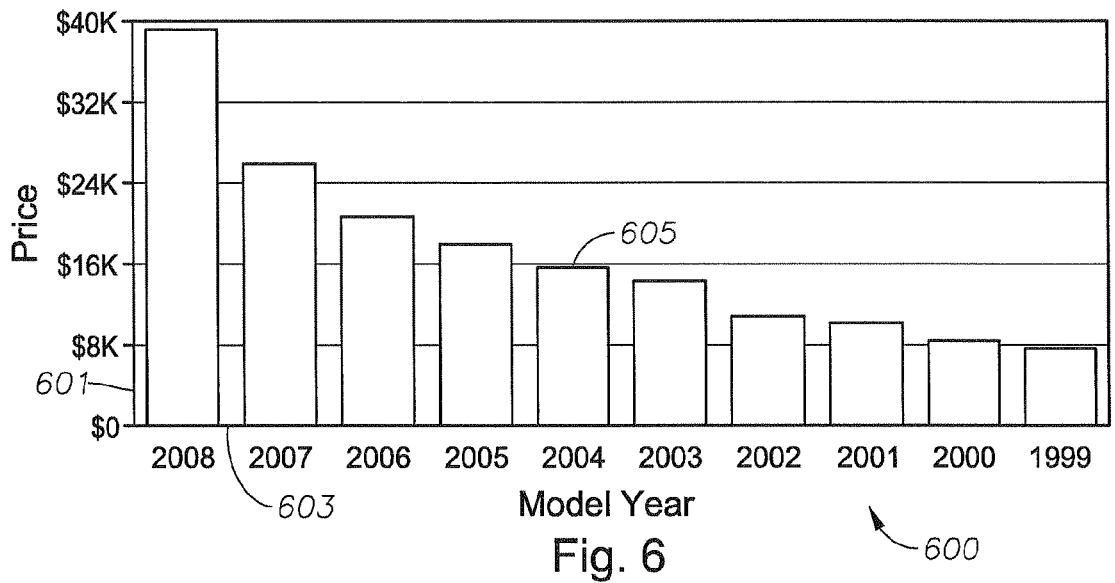
FIG. 6 is chart of product listings for a vehicle displaying collective price versus model year according to an example embodiment.

Example embodiments can include, for example, various two-dimensional and other multi-dimensional pricing graphs, including graphs of price versus model year, for example, for vehicles, as illustrated in FIGS. 5 and 6, wherein a first axis of the graph 501, 601 contains price information, and wherein a second axis of the graph 503, 603 contains model year information. The graph can display individual product listings 505 and can superimpose curve representing a best fit 507 as understood by those skilled in the art. Alternately, the price information of the two-dimensional graph can be collective price information 605, for example, an average price or a median price, so that the two-dimensional or multi-dimensional pricing graph is a chart. In addition, example embodiments can include a graph of price versus vintage year for a wine.

Figure 7:
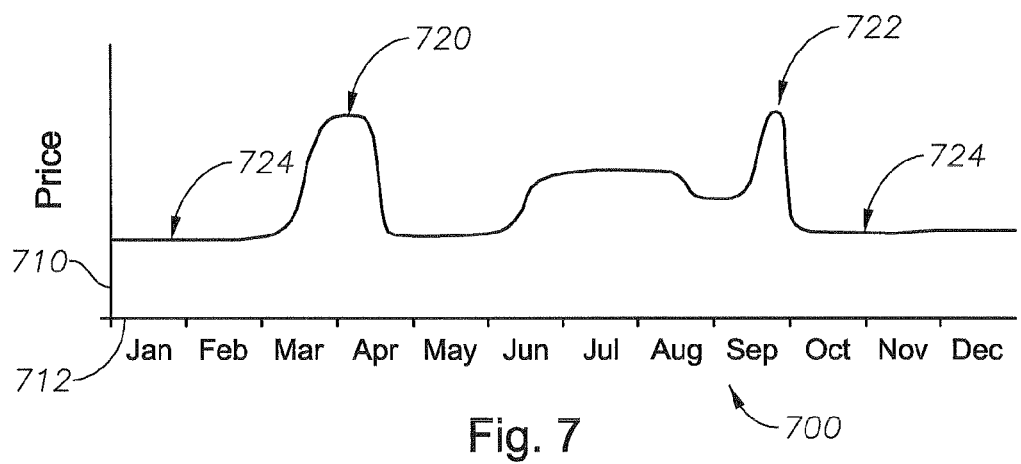
FIG. 7 is a two-dimensional pricing graph for a vacation rental displaying rental rate versus stay date according to an example embodiment.

Example embodiments can also include graphs of price versus dates associated with the product listings. For example, the multi-dimensional graph of product listings can include travel services with a second axis of the multi-dimensional graph containing information for the date of the travel services. That is, embodiments can include graphs of the price of an airline ticket or hotel stay versus the date of travel or the date of the stay. Weekend travel rates may be substantially different than midweek rates, as understood by those skilled in the art. As illustrated in FIG. 7, a weekly camp ground rental, for example, can have seasonal pricing, with spring break 720, End of Summer/Labor Day 722, and summer rates being substantially higher than a fall and winter rate 724 as understood by those skilled in the art.

Example embodiments can also include, for example, graphs of price versus dates associated with the product listings, such as a manufacture date or a publish date. As illustrated in FIG. 8, a product can decrease in value with age 820, but after a considerable amount of time can be considered rare and collectable, resulting in a spike in value 822 as understood by those skilled in the art. Example embodiments can, thus, help visualize when sellers consider a product to be an antique or merely old.

Example embodiments can include graphs of price versus distance from the consumer. As illustrated in FIG. 11, embodiments can also allow a consumer to click and drag on a multi-dimensional graph constituting a map 1100 to create a box 1101 that covers a particular geographical area. According to these embodiments, product listings 1103 can be associated with a geographical location, and the product listings website, in additional to a contact address, can prompt the consumer for a preferred price range to augment the product preference criteria captured through the drag-and-drop interface. After a selected time period, responsive to a product listing satisfying the criteria, i.e., within the price range and within the geographic area of interest, the website server sends an electronic alert to the contact address associated with the captured product preference criteria of the consumer.

Transactions involving products that do not generally move, for example, real estate, and alternatively products that are expensive to ship relative to their price, for example, furniture or vehicles, can benefit from associating the product with a particular geographical area as understood by those skilled in the art. Accordingly, the captured product preference data from the consumer can include a distance from a location associated with a consumer and the location associated with a product listing, allowing, for example, a consumer to receive an alert for a vehicle for sale within 25 miles of the consumer.

Example embodiments can also include a consumer dragging and dropping a box, a square, a circle, a rectangle, and other polygons as understood by those skilled in the art to indicate product preference criteria. In addition, embodiments can include consumers having the ability to narrow the results already shown on the graph by various refinements.

Embodiments include graphs of price versus the time the product listings have been on the market and other pricing graphs as understood by those skilled in the art. The longer a time a product listing has been on the market may be an indication that the price being asked is too high for the market as understood by those skilled in the art. If a product listing has been on the market for a long time, a frustrated seller typically lowers the price to attract buyers and often lowers the price substantially in order to sell the product, resulting in a "best deal" opportunity. Example embodiments can allow for the product preference criteria of the consumer to include a time a product listing has been on the market in order to target these frustrated sellers.

Other embodiments provide, for example, that the website is freely accessible by the general public through Internet, other global communications network, or other electronic network accessible computers, including mobile and other electronic devices that operate as or have access through one or more computers. These embodiments operate without requiring consumers to provide identifying information (except for the contact address), to log-in to the website, or otherwise pay for a subscription or fee as understood by those skilled in the art.

In a preferred embodiment, for example, the website is a website of an electronic retailer. In another embodiment, the website gathers information for product listings from other websites. In yet another embodiment, the website is an auction website, and the product listings include items being auctioned. Operationally, example embodiments complement the transactions and product offerings of a website, e.g., an electronic retailer or an online auction website. Such websites typically provide search capabilities, allowing a consumer to browse and sort product listings. Example embodiments can augment these capabilities by providing an easy and convenient way to search product listings through graphically capturing the product preference criteria through the drag-and-drop interface. Embodiments can provide, for example, a graphical way to trigger an electronic alert or notification of a future product listing. In addition, by storing the product preference criteria and responding to new product listings, embodiments can allow the consumer to save both time and computer resources because consumers do not need to diligently monitor the product listing website in order to find a "best deal" product.

Example embodiments can use, for example, the captured product preference criteria in two ways. First, the embodiments can include sending an electronic alert, e.g., an e-mail, to the address associated with the captured product preference criteria responsive to a new listing satisfying the criteria. New listings can include an offer for sale that satisfies the criteria made after the capturing of the criteria or a change in an offer, such as a price reduction, that satisfies the criteria made after the capturing of the criteria. Second, embodiments can aggregate the product preference criteria for sellers and potential sellers to determine a number of electronic alerts, e.g., e-mail alerts, which will be generated for a potential product listing as a function of a characteristic of the product listing, such as price. That is, embodiments can provide potential sellers with information about market demand, as well as a built-in market for their product listings. Therefore, both seller and buyer can benefit from the capturing of the product preference criteria. In addition, the website provider can benefit from the increased participation of sellers and consumers.

Example embodiments can provide for the electronic alert, e.g., the e-mail alert, to include an updated two-dimensional or multi-dimensional graph of product listings. By including an updated two-dimensional or multi-dimensional graph of product listings, embodiments can feature a particularly good deal and convey to the consumer in the alert just how good a deal in comparison to the other product listings in the graph.

Example embodiments can include superimposing a curve representing the best fit on a multi-dimensional graph. Determining a best fit curve 207, 307 for a collection of data points is well known in the art. For example, linear regression, as understood by those skilled in the art, is the process of finding a straight line (as by least squares) that best approximates a set of points on a graph. Regression can also be used to find a line, parabola, or other polynomial function that best approximates a set of points on a graph by minimizing an error function. It will be understood by those skilled in the art that other forms of curve-fitting instead of or in addition to linear regression and regression are to be included within the example embodiments. Example embodiments can include superimposing a curve representing the best fit on the two-dimensional or multi-dimensional graph to further enhance the consumer's understanding of the graph and the underlying data from the product listings.

Example embodiments can also address the problem of sellers, particularly post-retail sellers, such as, e.g., a private seller of a used car, having limited resources to gauge demand for their products. According to example embodiments, multiple consumers' criteria can be aggregated and shared with sellers. Example embodiments can include determining a number of electronic alerts that will be generated for a potential product listing as a function of a characteristic of the product listing, include price, so that a seller can gauge actual market demand prior to listing the product for sale. By allowing a seller to see demand as a function of price, sellers can more intelligently price their products. By allowing a seller to see demand as a function of a characteristic of the product listing, for example, sellers can more intelligently position their products. That is, these embodiments can allow sellers to conduct easy research into demand and target points where the largest numbers of willing and active consumers are looking. Example embodiments allow for positioning an e-commerce product related to graphical imputed consumer demand. Example embodiments can further provide a valuable marketing service to sellers by alerting consumers of the new listing satisfying their criteria. As discussed earlier, FIG. 4 provides a representation of the number of alerts as a function of price, and those skilled in the art will understand other embodiments of conveying a number of electronic alerts generated for a potential product listing having a particular characteristic, such as a given price.

Example embodiments can utilize enhancements in graphical displays and search technologies to easily capture data from consumers and to efficiently provide sellers with aggregate consumer demand information. A two-dimensional or multi-dimensional graph, for example, allows thousands of product listings to be displayed simultaneously on a computer screen as illustrated in FIG. 2; whereas, the same product listings from a traditional search engine can require the consumer to scroll through numerous pages of results.

To a consumer, for example, benefits of the embodiments can include being notified of new product listings that satisfy the consumer's criteria. As a result, consumers do not need to diligently monitor the product listing website in order to find a "best deal" product, saving both time and computer resources. In addition, such targeted alerts have the potential to reduce other less effective means of advertising, including junk mail and cold calls. Advantageously, a notification of a product listing according to example embodiments is expressly desired by the consumer, unlike solicitations generated from an electronic retailer based on tracking a consumer's interactions with a website or other solicitations as understood by those skilled in the art. Notifications or promotions based on the use of cookies and other technologies to track consumer behavior may attempt to learn or infer product preference criteria for a consumer. Without an express indication and approval from a consumer, however, the notifications can be ineffective or simply unwelcome. Example embodiments can provide, for example, accurate and desired notifications of product listings because consumers expressly invite them. In addition, by using an otherwise anonymous contact address, for example, a free e-mail address used only for limited purposes as understood by those skilled in the art, a consumer can indicate product listing preferences without raising privacy concerns. Furthermore, benefits of the embodiments can include an opportunity for a consumer to access a new product listing prior to the general public.

To a seller, for example, benefits of the embodiments can include access to consumers that have expressed interest in the seller's product at the seller's price point through electronic alerts or other demand criteria through electronic alerts. In addition, example embodiments advantageously provide sellers an informative look into at what price they would need to list their product in order to generate demand, increase demand, or otherwise sell their product more quickly. Sellers will know that by listing a product with a given characteristic, including, for example, a price or mileage, that X number of alerts will be sent out to interested consumers, as opposed to Y number of alerts with a different characteristic. Alternately, a seller will know that X' number of consumers have inquired (although did not request to receive electronic alerts) about a product with a given characteristic, including, for example, a price or mileage, as opposed to Y' number of consumers at, for example, a different price or mileage, as illustrated in FIG. 19. In addition, example embodiments allow a seller to analyze demand and supply curves to better price, including, for example, through computerized methods of actively selecting a price position, and to position a product for sale to thereby achieve a desired result, including maximizing revenue, minimizing the time to sell the product, or achieving a balance.

To a product listing website, for example, benefits of example embodiments can include increased sales velocity by providing added benefits to consumers looking for great deals and by helping sellers to better position and price their products correctly, to sell them quickly or to sell them as a desired price.

Figure 12:
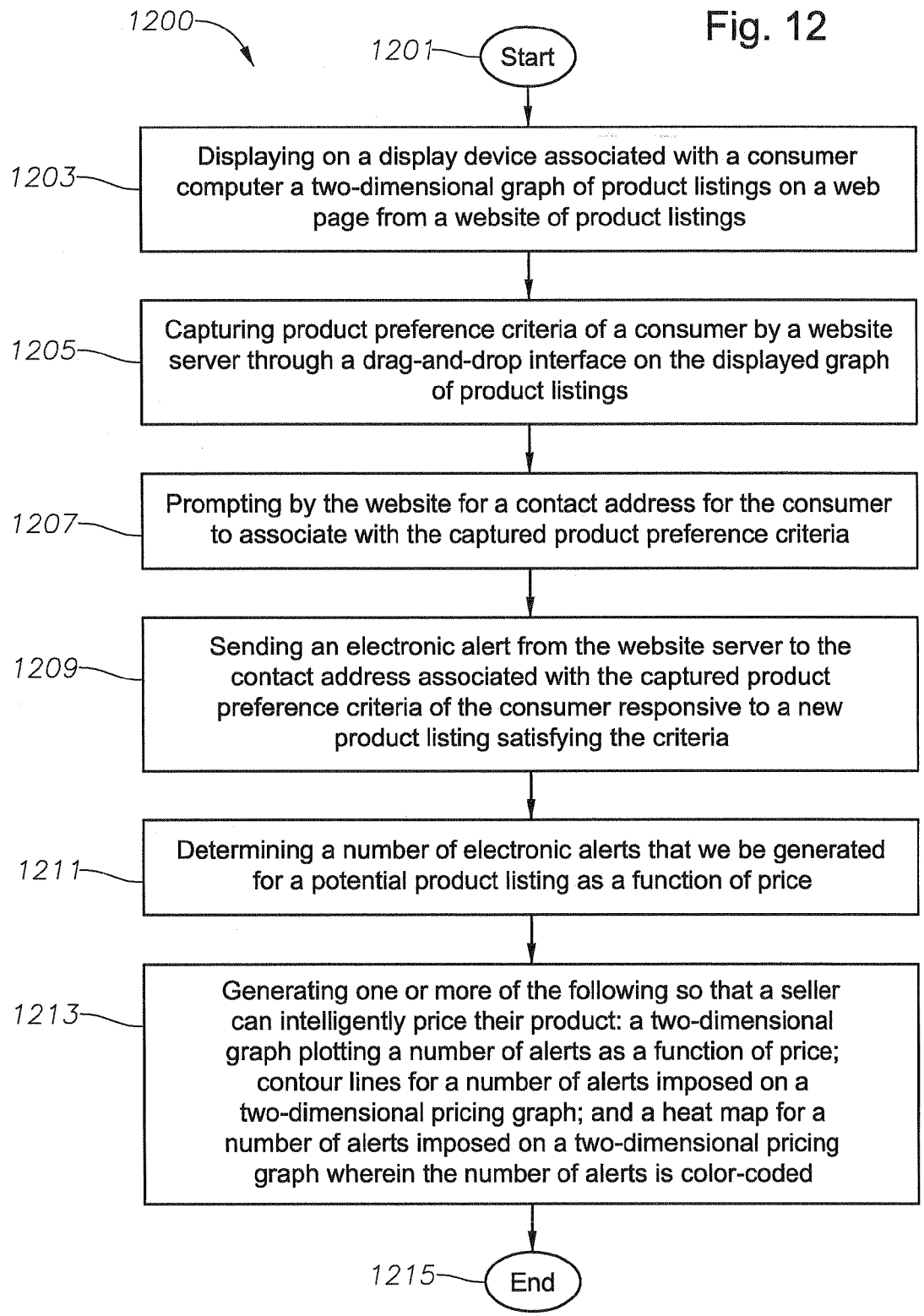
FIG. 12 is a flow diagram of a method of alerting a consumer of an existence of a new product listing according to an example embodiment.

Embodiments provide, for example, a method, e.g., a computerized method, of alerting a consumer of an existence of a new product listing, as illustrated in FIG. 12. The method can include displaying on a display device associated with a consumer computer a two-dimensional or multi-dimensional graph of product listings on a web page from a website of product listings 1203. The method can also include capturing product preference criteria of a consumer by a website server through a drag-and-drop interface on the displayed graph of product listings 1205 and prompting by the website server for a contact address for the consumer to associate with the captured product preference criteria 1207. The method can further include sending an electronic alert to the contact address associated with the captured product preference criteria of the consumer responsive to a new product listing satisfying the criteria 1209. The method can also include determining a number of alerts that will be generated for a potential product listing as a function of price 1211. The method can include generating one or more of the following so that a seller can intelligently price their product: a two-dimensional or multi-dimensional graph plotting a number of alerts as a function of price, contour lines for a number of alerts imposed on a two-dimensional or multi-dimensional pricing graph, a heat map for a number of alerts imposed on a two-dimensional or multi-dimensional pricing graph wherein the number of alerts is color-coded 1213.

Figure 13:
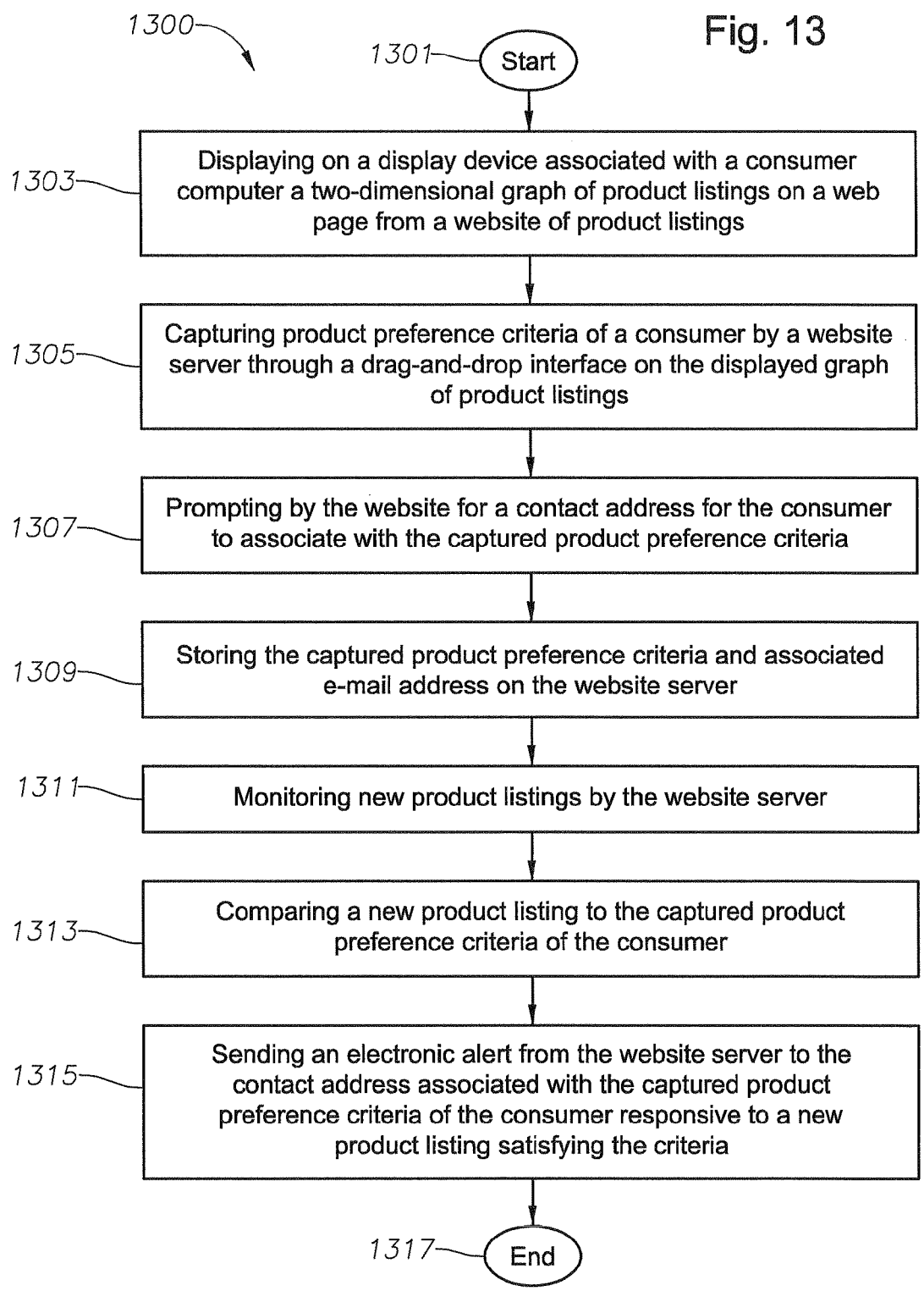
FIG. 13 is a flow diagram of a method of alerting a consumer of an existence of a new product listing according to an example embodiment.
Figure 14:
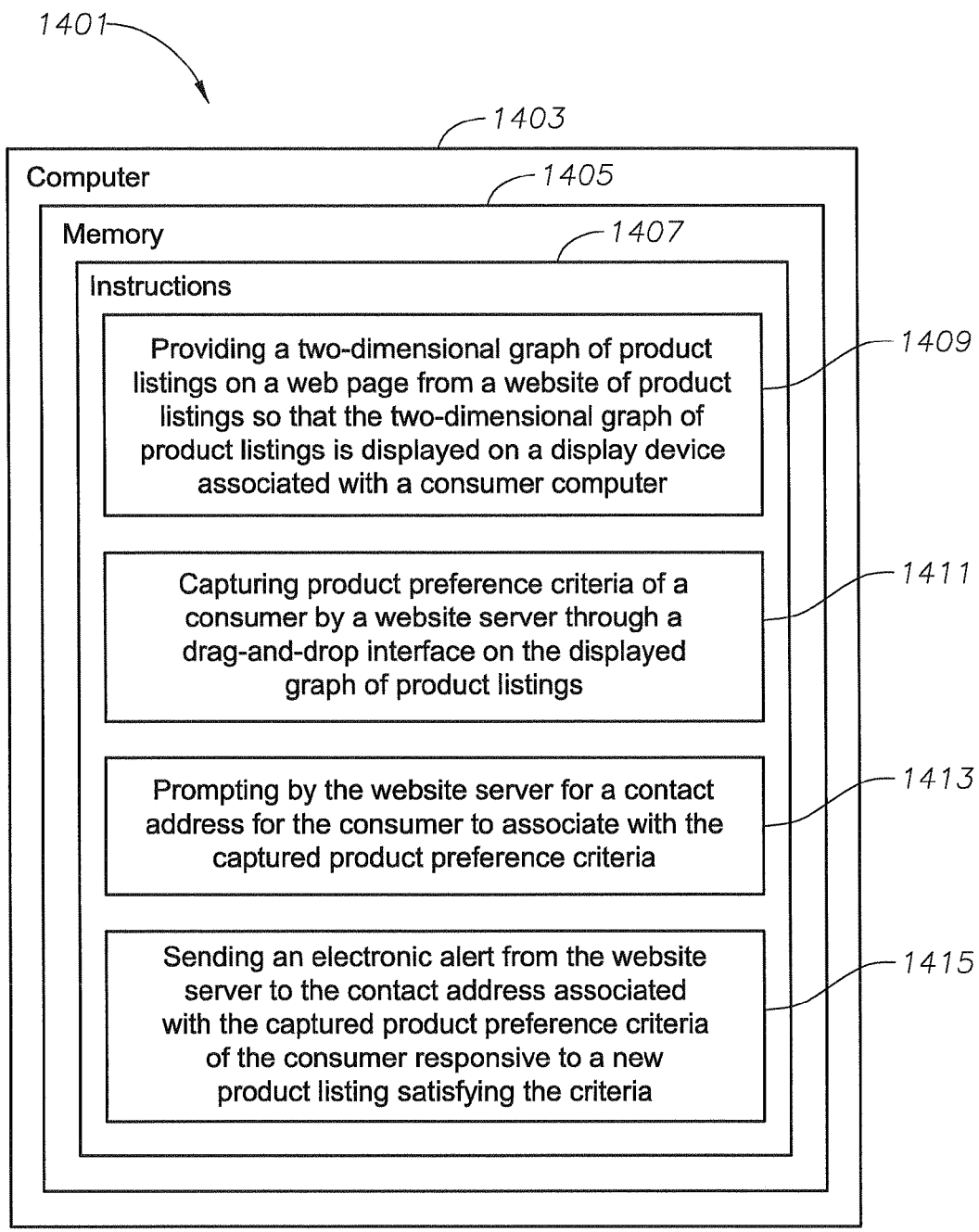
FIG. 14 is a schematic diagram of a computer program product according to an example embodiment.

Embodiments can provide, for example, a method, e.g., a computerized method, of alerting a consumer of an existence of a new product listing, as illustrated in FIG. 13. The method can include displaying on a display device associated with a consumer computer a two-dimensional or multi-dimensional graph of product listings on a web page from a website of product listings 1303. The method can also include capturing product preference criteria of a consumer by a website server through a drag-and-drop interface on the displayed graph of product listings 1305 and prompting by the website server for a contact address for the consumer to associate with the captured product preference criteria 1307. The method can include storing the captured product preference criteria and associated e-mail address on the website server 1309. The method can also include monitoring new product listings by the website server 1311. The method can further include comparing a new product listing to the captured product preference criteria of the consumer 1313. The method can include sending an electronic alert to the contact address associated with the captured product preference criteria of the consumer responsive to a new product listing satisfying the criteria 1315.

According to example embodiments, comparing a new product listing to the captured product preference criteria of the consumer can include comparing first a price of the new product listing with the price information in the captured product preference criteria of the consumer and then comparing other criteria a pre-selected order. In addition, comparing a new product listing to the captured product preference criteria of the consumer can involve one or more of the following: comparing a file associated with the new product listing with a file associated with the captured product preference criteria of the consumer, and comparing one or more database entries associated with the new product listing with one or more database entries associated with the captured product preference criteria of the consumer.

According to example embodiments, prompting by the website server for a contact address for the consumer can include a confirmation of the captured product preference criteria by the consumer.

Embodiments can provide, for example, another method of alerting a consumer of an existence of a new product listing. The method can include displaying on a display device associated with a consumer computer a two-dimensional or multi-dimensional map of product listings on a web page from a free, publicly-accessible website. Each product listing is associated with a geographical location. The method can also include capturing product preference criteria of a consumer by a website server through a drag-and-drop interface on the displayed graph of product listings. The method can include prompting by the website server for a preferred price range to augment the product preference criteria captured through the drag-and-drop interface. The method can include prompting by the website server for a contact address for the consumer to associate with the captured product preference criteria. The method can further include sending an electronic alert from the website server to the contact address associated with the captured product preference criteria of the consumer responsive to a new product listing satisfying the criteria.

Embodiments can provide, for example, a system 100 of alerting a consumer of an existence of a new product listing, as illustrated in FIG. 1. The system 100 can include a first computer 103, having memory 105, associated with a website of product listings 101 defining a website server 103. The website server 103 is positioned to display product listings and to gather consumer product preference criteria. The system 100 can also include a second computer, having a display 108, memory 109, and a browser 110, associated with a consumer defining a consumer computer 107 and a third computer, having memory 113, associated with a seller defining a seller computer 111. The seller computer 111 and the consumer computer 107 are in communication with the website server through an electronic communications network 115; the seller computer is positioned to provide product listing information to the website server. The 100 system can further include a computer program product 117 associated with the website server 103 as discussed below.

Figure 17:
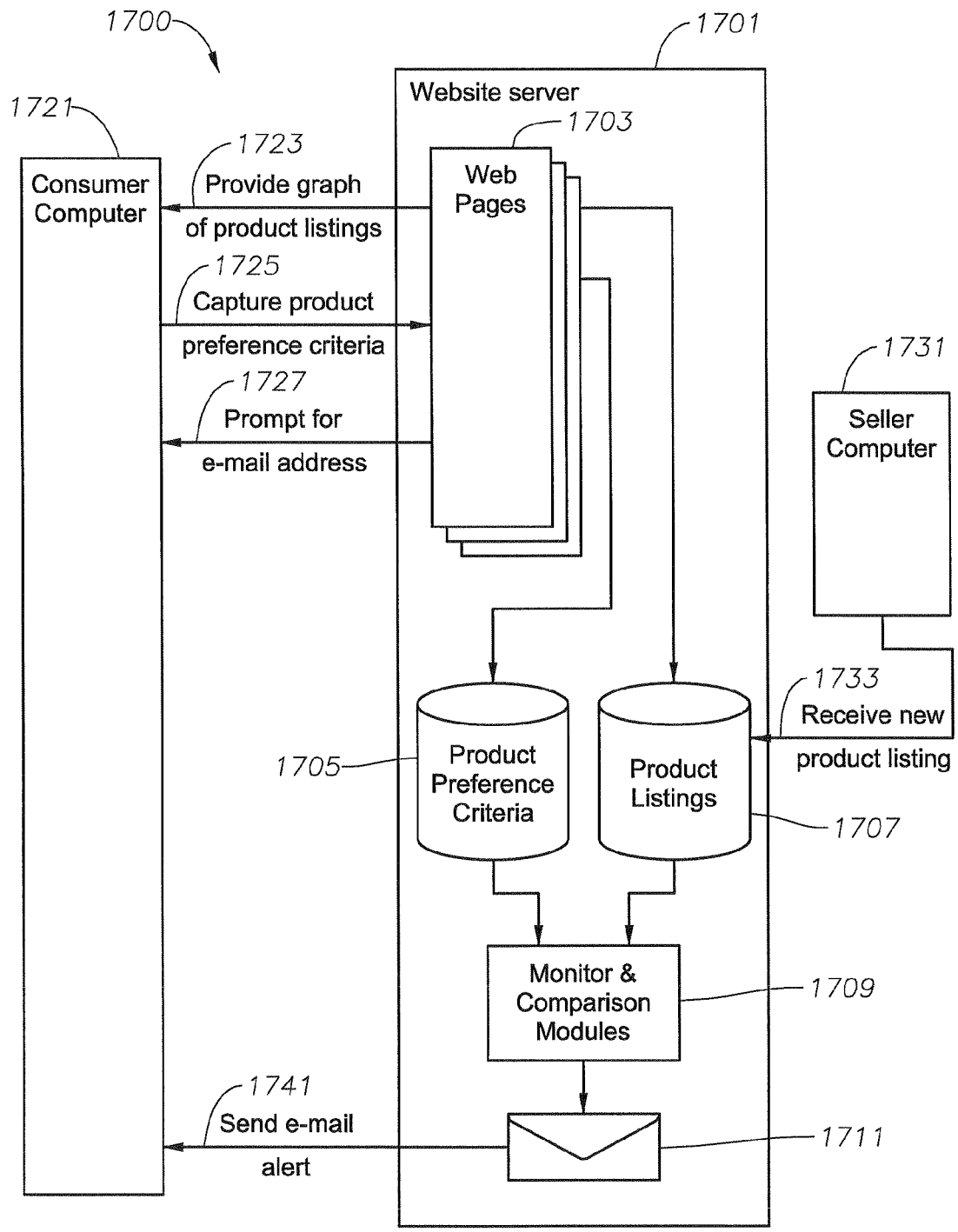
FIG. 17 is a schematic diagram of a system according to an example embodiment.

Embodiments can provide, for example, a system 1700 of alerting a consumer of an existence of a new product listing, as illustrated in FIG. 17. The system 1700 can include a consumer computer 1721 and a website server 1701. The system can also include an optional seller computer 1731. The website server 1701 can provide a multi-dimensional graph of product listings 1723 on a web page 1703 so that the graph is displayed on the consumer computer 1721. The web pages 1703 can reflect product listing data stored in a database of product listings 1707 and can quickly update in real time, e.g., dynamically to the consumer or viewer, as understood by those skilled in the art. The website server 1701 can capture product preference criteria entered in to the web pages 1703 by various means including through a drag-and-drop interface 1725 on the displayed graph of product listings, as understood by those skilled in the art. The website server 1701 can store this data in a database of product preference criteria 1705. The website server 1701 can further prompt the consumer for a contact address, e.g., an e-mail address 1727, to associate with the product preference criteria stored in the database 1705. Next, the website server 1701 can receive a new product listing from a seller computer 1731. (Alternately, the website server 1701 can generate the new product list.) A monitor and comparison software module 1709 running on the website server 1701 can compare the new product listing with the product preference criteria stored in database 1705. If the product preference criteria are satisfied, an e-mail software module 1711 can generate an e-mail to the consumer, and the website server can send an e-mail alert to the consumer computer 1741, notifying the consumer about the new product listing satisfying the consumer's criteria.

Figure 18:
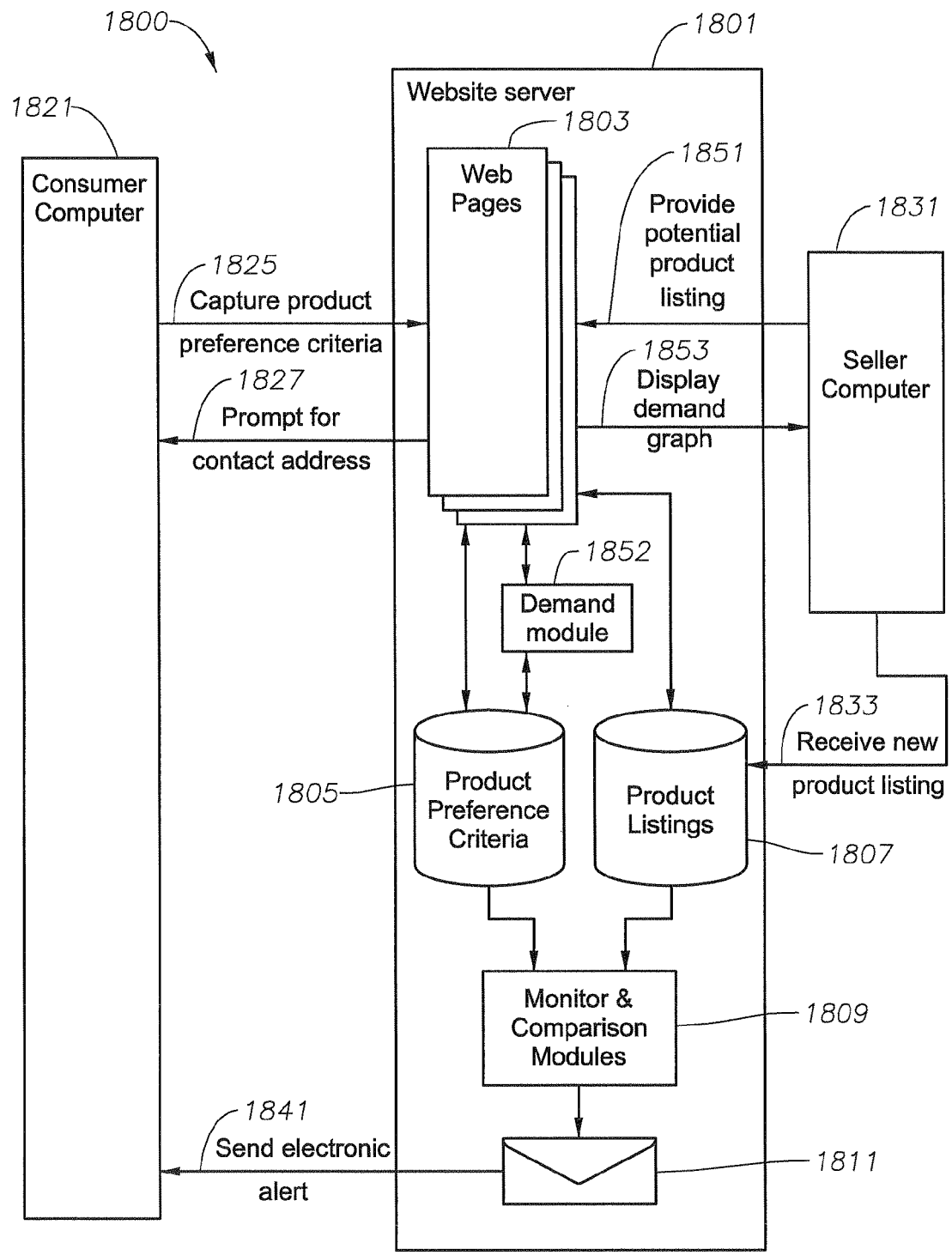
FIG. 18 is a schematic diagram of a system according to another example embodiment.

Embodiments can provide, for example, a system 1800 of demand-driven e-commerce, as illustrated in FIG. 18. The system 1800 can include a consumer computer 1821, a website server 1801, and a seller computer 1831. The website server 1801 can provide product listings on a web page 1803 to the consumer computer 1821. The web pages 1803 can reflect product listing data stored in a database of product listings 1807 and quickly update in real time, e.g., dynamically to the consumer or viewer, as understood by those skilled in the art. The website server 1801 can capture product preference criteria entered in to the web pages 1803 by various means, as understood by those skilled in the art. The website server 1801 can store this data in a database of product preference criteria 1805. The website server 1801 can further prompt the consumer for a contact address 1827, e.g., an e-mail address, to associate with the product preference criteria stored in the database 1805. Next, a seller computer 1831 can provide a potential product listing 1851 to the website server 1801. The website server 1801 can, through a demand generation module 1852, determine a number of electronic alerts that will be generated for the potential product listing, i.e., a demand, as a function of price responsive to an aggregate of captured product preference criteria for a plurality of consumers stored in the database 1805. Next, the website server 1801 can receive a new product listing 1833 from the seller computer 1831. (Alternately, the website server 1801 can generate the new product listing.) A monitor and comparison software module 1809 running on the website server 1801 can compare the new product listing with the product preference criteria stored in database 1805. If the product preference criteria are satisfied, an e-mail software module 1811 can generate an electronic alert to the consumer, and the website server can send the alert to the consumer computer 1841, notifying the consumer about the new product listing satisfying the consumer's criteria.

Embodiments can provide, for example, a computer program product 1401, stored on a tangible computer readable memory media 1405, operable on a computer 1403, the computer program product 1401 comprising a set of instructions that, when executed by the computer 1403, cause the computer to perform various operations. The operations can include providing a two-dimensional or multi-dimensional graph of product listings on a web page from a website of product listings 1409. The operations can also include capturing product preference criteria of a consumer through a drag-and-drop interface on the displayed graph of product listings 1411 and prompting for a contact address for the consumer to associate with the captured product preference criteria 1413. The operations can further include sending an electronic alert to the contact address associated with the captured product preference criteria of the consumer responsive to a new product listing satisfying the criteria 1415.

Embodiments can provide, for example, a computer program product, stored on a tangible computer readable memory media, operable on a computer, the computer program product comprising a set of instructions that, when executed by the computer, cause the computer to perform various operations. The operations can include providing a two-dimensional or multi-dimensional map of product listings on a web page from a free, publicly-accessible website so that the two-dimensional or multi-dimensional map of product listings is displayed on a display device associated with a consumer computer. Each product listing is associated with a geographical location. The operations can also include capturing product preference criteria of a consumer through a drag-and-drop interface on the displayed graph of product listings, prompting for a preferred price range to augment the product preference criteria captured through the drag-and-drop interface, and prompting for a contact address for the consumer to associate with the captured product preference criteria. The operations can further include sending an electronic alert to the contact address associated with the captured product preference criteria of the consumer responsive to a new product listing satisfying the criteria.

Embodiments can provide, for example, for a method of e-commerce, as illustrated in FIG. 20. The method 2000 can include capturing in a database product preference criteria for a consumer by a website server associated with a website of product listings 2003. The product preference criteria can include price information. The method can involve the consumer using one or more of a menu, a computerized search, a form, a slider to thereby indicate a range, and a multi-dimensional graph of product listings. The method can further involve tracking interactions of the consumer with the website of the product listings to thereby derive product preference criteria for the consumer. The method 2000 can include prompting by the website server for a contact address for the consumer to associate with the captured product preference criteria 2005 so that the consumer expressly confirms an interest in receiving an electronic alert regarding new product listings that satisfy the product preference criteria. The method 2000 can include determining a number of electronic alerts that will be generated for a potential product listing as a function of price responsive to an aggregate of captured product preference criteria for a plurality of consumers 2007. The method can include displaying on a display device associated with a computer of a seller a multi-dimensional graph of the number of alerts for a potential product listing 2009 so that the seller can gauge market demand prior to listing a product for sale and so that the seller can more intelligently price the product. The method can include receiving a new product listing from a seller by the website server 2011. The method can further include sending an electronic alert from the website server to the contact address associated with the captured product preference criteria of the consumer responsive to a new product listing that satisfies the criteria 2013. The method can include an invitation for the consumer to access the product listing prior to the product listing being available to the general public.

Embodiments can provide, for example, for a method of e-commerce, as illustrated in FIG. 21. The method 2100 can include capturing in a database product preference criteria for a consumer by a website server associated with a website of product listings 2103. The method can include determining a demand for a potential product listing as a function of a characteristic of the product listing responsive to an aggregate of captured product preference criteria for a plurality of consumers 2105. The characteristic of the product listing can include price, age, quality, location, and other attributes as understood by those skilled in the art. The method can further include displaying on a display device associated with a computer of a seller a multi-dimensional graph of the demand for the potential product listing 2107 so that the seller can gauge market demand prior to listing a product for sale and so that the seller can more intelligently price the product. The method can also include prompting by the website server for a contact address for the consumer to associate with the captured product preference criteria so that the consumer expressly confirms an interest in receiving an electronic alert regarding new product listings that satisfy the product preference criteria. The method can further include displaying on the display device associated with the computer of the seller the multi-dimensional graph of demand for the product involves distinguishing demand expressly confirmed by one or more consumers and unconfirmed demand derived by tracking interactions of one or more consumers.

Embodiments can provide, for example, a computer program product 2201, stored on a tangible computer readable memory media 2205, operable on a computer 2203, the computer program product 2201 comprising a set of instructions that, when executed by the computer 2203, cause the computer to perform various operations. The operations can include capturing in a database product preference criteria for a consumer by a website server associated with a website of product listings 2209. The operations can also include determining a demand for a potential product listing as a function of a characteristic of the product listing responsive to an aggregate of captured product preference criteria for a plurality of consumers 2211. The characteristic of the product listing can include price, age, quality, location, and other attributes as understood by those skilled in the art. The operations can further include displaying on a display device associated with a computer of a seller a multi-dimensional graph of the demand for the potential product listing 213 so that the seller can gauge market demand prior to listing a product for sale and so that the seller can more intelligently price the product.

In addition, embodiments can include other systems, program products, and associated methods of alerting a consumer of a new product listing and determining a number of electronic alerts that will be generated for a potential product listing as a function of price so that a seller can gauge actual market demand prior to listing the product for sale, as will be understood by those skilled in the art.

Embodiments can provide, for example, a system of demand-driven electronic commerce may comprise one or more of: (a) a first computer associated with a website defining a website server, the website server being positioned to provide a website of product listings and to gather consumer product preference criteria; (b) a plurality of second computers, each second computer associated with a consumer defining a consumer computer, the consumer computer in communication with the website server through an electronic communications network; (c) one or more third computers, each third computer associated with a seller defining a seller computer, the seller computer in communication with the website server through the electronic communications network and being positioned to provide product listing information to the website server; and (d) a computer program product associated with the website server, stored on a tangible computer readable memory media, and operable on a computer, the computer program product comprising a set of instructions that, when executed by the website server, cause the website server to perform the operations of: (i) capturing in a database product preference criteria for a consumer by the website server, the product preference criteria including price information, (ii) prompting by the website server for a contact address for the consumer to associate with the captured product preference criteria so that the consumer expressly confirms an interest in receiving an electronic alert regarding new product listings that satisfy the product preference criteria, (iii) determining a number of electronic alerts that will be generated for a potential product listing as a function of price responsive to an aggregate of captured product preference criteria for a plurality of consumers, (iv) displaying on a display device associated with the one or more seller computers a multi-dimensional graph of the number of alerts for a potential product listing so that the seller can gauge market demand prior to listing a product for sale and so that the seller can more intelligently price the product, (v) receiving a new product listing from the seller computer by the website server, or (vi) sending an electronic alert from the website server to the contact address associated with the captured product preference criteria of the consumer responsive to a new product listing that satisfies the criteria.

In an embodiment of the present disclosure, the operation of capturing in the database product preference criteria for the consumer by the website server may involve the consumer using one or more of the following: a menu, a computerized search, a form, a slider to thereby indicate a range, and a multi-dimensional graph of product listings. In an embodiment of the present disclosure, the operation of capturing in the database product preference criteria for the consumer by the website server may involve tracking interactions of the consumer with the website of the product listings to thereby derive product preference criteria for the consumer. In an embodiment of the present disclosure, the operations may further comprise generating one or more of the following so that the seller can intelligently price the potential product listing (i) a two-dimensional graph plotting a number of electronic alerts to as a function of price; (ii) contour lines for a number of alerts imposed on a pricing graph; or (iii) a heat map for a number of alerts imposed on a pricing graph wherein the number of alerts is color-coded. In an embodiment of the present disclosure, the electronic alert may include an invitation for the consumer to access the product listing prior to the product listing being available generally to a public.

Embodiments can provide, for example, a system of demand-driven electronic commerce may comprise one or more of: (a) a first computer associated with a website defining a website server, the website server being positioned to provide a website of product listings and to gather consumer product preference criteria; (b) a plurality of second computers, each second computer associated with a consumer defining a consumer computer, the consumer computer in communication with the website server through an electronic communications network; (c) one or more third computers, each third computer associated with a seller defining a seller computer, the seller computer in communication with the website server through the electronic communications network and being positioned to provide product listing information to the website server; and (d) a computer program product associated with the website server, stored on a tangible computer readable memory media, and operable on a computer, the computer program product comprising a set of instructions that, when executed by the website server, cause the website server to perform one or more operations of (i) capturing in a database product preference criteria for a consumer by the website server, (ii) determining a demand for a potential product listing as a function of a characteristic of the product listing responsive to an aggregate of captured product preference criteria for a plurality of consumers, and (iii) displaying on a display device associated with the one or more seller computers a multi-dimensional graph of the demand for the potential product listing so that the seller can gauge market demand prior to listing a product for sale.

In an embodiment of the present disclosure, the operation of capturing in the database product preference criteria for the consumer by the website server may involve the consumer using one or more of the following: a menu, a computerized search, a form, a slider to thereby indicate a range, and a multi-dimensional graph of product listings, and wherein the product preference criteria include price information. In an embodiment of the present disclosure, the operation of capturing in the database product preference criteria for the consumer by the website server may involve tracking interactions of the consumer with the website of the product listings to thereby derive product preference criteria for the consumer. In an embodiment of the present disclosure, the operations may further comprise generating one or more of the following so that the seller can intelligently price the potential product listing: a two-dimensional graph plotting the demand as a function of price; contour lines for the demand imposed on a pricing graph; or a heat map for the demand imposed on a pricing graph wherein the demand is color-coded.

In an embodiment of the present disclosure, the operations may further comprise prompting by the website server for a contact address for the consumer to associate with the captured product preference criteria so that the consumer expressly confirms an interest in receiving an electronic alert regarding new product listings that satisfy the product preference criteria, and wherein displaying on the display device associated with the seller computer the multi-dimensional graph of demand for the product involves distinguishing demand expressly confirmed by one or more consumers and unconfirmed demand derived by tracking interactions of one or more consumers.

Embodiments can provide, for example, a method of alerting a consumer of an existence of a new product listing may comprise: (a) displaying on a display device associated with a consumer computer a multi-dimensional graph of product listings on a web page from a website of product listings, a first axis of the multi-dimensional graph containing price information; (b) capturing product preference criteria of a consumer by a website server in communication with the consumer computer and through use of a drag-and-drop interface on the displayed graph of product listings; (c) prompting by the website server for an e-mail address for the consumer to associate with the captured product preference criteria responsive to the capturing of the criteria; (d) storing the captured product preference criteria and associated e-mail address on the website server; (e) monitoring by the website server for new product listings; (f) comparing a new product listing to the captured product preference criteria of the consumer; or (g) sending an e-mail alert by the website server to the e-mail address associated with the captured product preference criteria of the consumer responsive to the new product listing satisfying the criteria.

In an embodiment of the present disclosure, a second axis of the multi-dimensional graph contains one or more of the following: mileage information for vehicles; model year information for vehicles; date information associated with travel services; manufacturing date information; distance information of a location associated with the consumer from a location associated with the product listing; and information related to a time the product listings have been on the market. A method pursuant to an embodiment of the present disclosure may comprise displaying a multi-dimensional graph of product listings on a website includes superimposing a curve representing the best fit on the multi-dimensional graph. A method pursuant to an embodiment of the present disclosure may comprise determining a number of e-mail alerts that will be generated for a potential product listing as a function of price so that a seller can gauge actual market demand prior to listing the product for sale.

A method pursuant to an embodiment of the present disclosure may comprise generating one or more of the following so that a seller can intelligently price their product: (a) a two-dimensional graph plotting a number of alerts as a function of price; (b) contour lines for a number of alerts imposed on a pricing graph; and (c) a heat map for a number of alerts imposed on a pricing graph wherein the number of alerts is color-coded.

A method pursuant to an embodiment of the present disclosure may comprise comparing a new product listing to the captured product preference criteria of the consumer includes comparing first a price of the new product listing with the price information in the captured product preference criteria of the consumer and then comparing other criteria a pre-selected order, and wherein comparing a new product listing to the captured product preference criteria of the consumer involves one or more of the following: comparing a file associated with the new product listing with a file associated with the captured product preference criteria of the consumer, and comparing one or more database entries associated with the new product listing with one or more database entries associated with the captured product preference criteria of the consumer.

A method pursuant to an embodiment of the present disclosure may comprise: (a) alerting a consumer of an existence of a new product listing; (b) displaying on a display device associated with a consumer computer a multi-dimensional graph of product listings on a web page from a website of product listings; (c) capturing product preference criteria of a consumer by a website server through a drag-and-drop interface on the displayed graph of product listings; (d) prompting by the website server for a contact address for the consumer to associate with the captured product preference criteria; or (e) sending an electronic alert from the website server to the contact address associated with the captured product preference criteria of the consumer responsive to a new product listing satisfying the criteria.

In an embodiment of the present disclosure, a contact address may comprise one or more of the following: an e-mail address, a phone number, a pager number, an address associated with a computer desktop widget application, an address associated with a mobile widget application, and a fax number. In an embodiment of the present disclosure, a first axis of the multi-dimensional graph contains price information, and wherein a second axis of the multi-dimensional graph contains one or more of the following: mileage information for vehicles; model year information for vehicles; date information associated with travel services; manufacturing date information; distance information of a location associated with the consumer from a location associated with the product listing; and information related to a time the product listings have been on the market.

A method pursuant to an embodiment of the present disclosure may comprise determining a number of electronic alerts that will be generated for a potential product listing as a function of price so that a seller can gauge actual market demand prior to listing the product for sale. A method pursuant to an embodiment of the present disclosure may comprise generating one or more of the following so that a seller can intelligently price their product: a two-dimensional graph plotting a number of alerts as a function of price; contour lines for a number of alerts imposed on a pricing graph; and a heat map for a number of alerts imposed on a pricing graph wherein the number of alerts is color-coded.

In an embodiment of the present disclosure, a website of product listings may be freely accessible by the general public through an electronic communications network to thereby provide the largest possible market for the products. In an embodiment of the present disclosure, a method of displaying a multi-dimensional graph of product listings on a website includes superimposing a curve representing the best fit on the multi-dimensional graph. In an embodiment of the present disclosure, an electronic alert includes an updated multi-dimensional graph of product listings. In an embodiment of the present disclosure, a method of prompting by the website server for a contact address for the consumer may include a confirmation of the captured product preference criteria by the consumer.

In an embodiment of the present disclosure, a method of alerting a consumer of an existence of a new product listing may comprise (a) displaying on a display device associated with a consumer computer a multi-dimensional map of product listings on a web page from a free, publicly-accessible website, each product listing being associated with a geographical location; (b) capturing product preference criteria of a consumer by a website server through a drag-and-drop interface on the displayed graph of product listings; (c) prompting by the website server for a preferred price range to augment the product preference criteria captured through the drag-and-drop interface; (d) prompting by the website server for a contact address for the consumer to associate with the captured product preference criteria; or (d) sending an electronic alert from the website server to the contact address associated with the captured product preference criteria of the consumer responsive to a new product listing satisfying the criteria.

In an embodiment of the present disclosure, product listings may include one or more of the following: vehicles, furniture, and real estate. In an embodiment of the present disclosure, a method may comprise determining a number of electronic alerts that will be generated for a potential product listing as a function of price so that a seller can gauge actual market demand.

An embodiment of the present disclosure may comprise a computer program product, stored on a tangible computer readable memory media, operable on a computer, the computer program product comprising a set of instructions that, when executed by the computer, cause the computer to perform the operations of: (a) providing a multi-dimensional graph of product listings on a web page from a website of product listings so that the multi-dimensional graph of product listings is displayed on a display device associated with a consumer computer; (b) capturing product preference criteria of a consumer by a website server through a drag-and-drop interface on the displayed graph of product listings; (c) prompting by the website server for a contact address for the consumer to associate with the captured product preference criteria; or (d) sending an electronic alert from the website server to the contact address associated with the captured product preference criteria of the consumer responsive to a new product listing satisfying the criteria.

In an embodiment of the present disclosure, a contact address may comprise one or more of the following: an e-mail address, a phone number, a pager number, an address associated with a computer desktop widget application, an address associated with a mobile widget application, and a fax number. In an embodiment of the present disclosure, a first axis of a multi-dimensional graph may contain price information, and wherein a second axis of the multi-dimensional graph contains one or more of the following: mileage information for vehicles; model year information for vehicles; date information associated with travel services; manufacturing date information; distance information of a location associated with the consumer from a location associated with the product listing; and information related to a time the product listings have been on the market. In an embodiment of the present disclosure, operations may further comprise determining a number of electronic alerts that will be generated for a potential product listing as a function of price so that a seller can gauge actual market demand prior to listing the product for sale. In an embodiment of the present disclosure, operations may further comprise generating one or more of the following so that a seller can intelligently price their product: a two-dimensional graph plotting a number of alerts as a function of price; contour lines for a number of alerts imposed on a pricing graph; and a heat map for a number of alerts imposed on a pricing graph wherein the number of alerts is color-coded.

In an embodiment of the present disclosure, a website of product listings may be freely accessible by the general public through an electronic communications network to thereby provide the largest possible market for the products. In an embodiment of the present disclosure, displaying a multi-dimensional graph of product listings may include superimposing a curve representing the best fit on the multi-dimensional graph. In an embodiment of the present disclosure, an electronic alert may include an updated multi-dimensional graph of product listings.

Embodiments can provide, for example, a computer program product, stored on a tangible computer readable memory media, operable on a computer, may comprise a set of instructions that, when executed by the computer, cause the computer to perform the operations of: providing a multi-dimensional map of product listings on a web page from a free, publicly-accessible website so that the multi-dimensional map of product listings is displayed on a display device associated with a consumer computer, each product listing being associated with a geographical location; capturing product preference criteria of a consumer through a drag-and-drop interface on the displayed graph of product listings; prompting for a preferred price range to augment the product preference criteria captured through the drag-and-drop interface; prompting for a contact address for the consumer to associate with the captured product preference criteria; or sending an electronic alert to the contact address associated with the captured product preference criteria of the consumer responsive to a new product listing satisfying the criteria.

In an embodiment of the present disclosure, product listings may include one or more of the following: vehicles, furniture, and real estate. In an embodiment of the present disclosure, operations may further comprise determining a number of electronic alerts that will be generated for a potential product listing as a function of price so that a seller can gauge actual market demand.

In an embodiment of the present disclosure, a system of alerting consumers of a new product listing may comprise one or more of: (a) a first computer associated with a website defining a website server, the website server being positioned to provide a website of product listings and to gather consumer product preference criteria; (b) a second computer associated with a consumer defining a consumer computer, the consumer computer in communication with the website server through an electronic communications network; (c) a third computer associated with a seller defining a seller computer, the seller computer in communication with the website server through an electronic communications network and being positioned to provide product listing information to the website server; and (d) a computer program product associated with the website server, stored on a tangible computer readable memory media, and operable on a computer, the computer program product comprising a set of instructions that, when executed by the website server, cause the website server to perform the operations of: (i) providing a multi-dimensional graph of product listings on a web page of a website of product listings so that the multi-dimensional graph of product listings is displayed on a display device associated with the consumer computer, (ii) capturing product preference criteria of the consumer through a drag-and-drop interface on the displayed graph of product listings, (iii) prompting for a contact address for the consumer to associate with the captured product preference criteria, or (iv) sending an electronic alert to the contact address associated with the captured product preference criteria of the consumer responsive to a new product listing satisfying the criteria.

In an embodiment of the present disclosure, operations may further comprise determining a number of electronic alerts that will be generated for a potential product listing as a function of price so that a seller can gauge actual market demand. In an embodiment of the present disclosure, operations may further comprise generating one or more of the following so that a seller can intelligently price their product: a two-dimensional graph plotting a number of alerts as a function of price; contour lines for a number of alerts imposed on a pricing graph; and a heat map for a number of alerts imposed on a pricing graph wherein the number of alerts is color-coded.

In an embodiment of the present disclosure, a system of alerting a consumer of an existence of a new product may comprise one or more of: (a) a first computer associated with a website defining a website server, the website server being positioned to provide a website of product listings and to gather consumer product preference criteria; (b) a second computer associated with a consumer defining a consumer computer, the consumer computer in communication with the website server through an electronic communications network; (c) a third computer associated with a seller defining a seller computer, the seller computer in communication with the website server through an electronic communications network and being positioned to provide product listing information to the website server; and (d) a computer program product associated with the website server, stored on a tangible computer readable memory media, and operable on a computer, the computer program product comprising a set of instructions that, when executed by the website server, cause the website server to perform the operations of: (i) providing a multi-dimensional map of product listings on a web page from a free, publicly-accessible website so that the multi-dimensional map of product listings is displayed on a display device associated with the consumer computer, each product listing being associated with a geographical location, (ii) capturing product preference criteria of a consumer through a drag-and-drop interface on the displayed graph of product listings, prompting for a preferred price range to augment the product preference criteria captured through the drag-and-drop interface, (iii) prompting for a contact address for the consumer to associate with the captured product preference criteria, and (iv) sending an electronic alert to the contact address associated with the captured product preference criteria of the consumer responsive to a new product listing satisfying the criteria. In an embodiment of the present disclosure, operations may further comprise determining a number of electronic alerts that will be generated for a potential product listing as a function of price so that a seller can gauge actual market demand.

A person having ordinary skill in the art will recognize that various types of memory are readable by a computer such as described herein, e.g., website server, consumer computer, seller computer, or other computers within the example embodiments. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, memory sticks, and other newer types of memories, and transmission type media such as digital and analog communication links. For example, such media can include operating instructions, as well as instructions related to the system and the method steps described above and can operate on a computer. It will be understood by those skilled in the art that such media can be at other locations instead of or in addition to the website server computer to store program products, e.g., including software, thereon.

Many modifications and other embodiments of the invention will come to the mind of one skilled in the art having the benefit of the teachings presented in the foregoing descriptions and the associated drawings. Therefore, it is to be understood that the invention is not to be limited to the illustrated embodiments disclosed, and that modifications and other embodiments are intended to be included within the scope of the appended claims.

That claimed is:

1. A method of e-commerce, the method comprising:
   capturing in a database product preference criteria for a consumer by a website server associated with a website of product listings, the product preference criteria including price information;
   prompting by the website server for a contact address for the consumer to associate with the captured product preference criteria so that the consumer expressly confirms an interest in receiving an electronic alert regarding new product listings that satisfy the product preference criteria;
   determining a number of electronic alerts that will be generated for a potential product listing as a function of price responsive to an aggregate of captured product preference criteria for a plurality of consumers;
   displaying on a display device associated with a computer of a seller a multi-dimensional graph of the number of alerts for a potential product listing so that the seller can gauge market demand prior to listing a product for sale and so that the seller can more intelligently price the product;
   receiving a new product listing from a seller by the website server; and
   sending an electronic alert from the website server to the contact address associated with the captured product preference criteria of the consumer responsive to a new product listing that satisfies the criteria.

2. A method of claim 1, wherein the step of capturing in the database product preference criteria for the consumer by the website server involves the consumer using one or more of the following: a menu, a computerized search, a form, a slider to thereby indicate a range, and a multi-dimensional graph of product listings.

3. A method of claim 1, wherein the step of capturing in the database product preference criteria for the consumer by the website server involves tracking interactions of the consumer with the website of the product listings to thereby derive product preference criteria for the consumer.

4. A method of claim 1, further comprising generating one or more of the following so that the seller can intelligently price the potential product listing:
   a two-dimensional graph plotting a number of electronic alerts as a function of price;
   contour lines for a number of alerts imposed on a pricing graph; and
   a heat map for a number of alerts imposed on a pricing graph wherein the number of alerts is color-coded.

5. A method of claim 1, wherein the electronic alert includes an invitation for the consumer to access the product listing prior to the product listing being available generally to a public.

6. A method of e-commerce, the method comprising:
   capturing in a database product preference criteria for a consumer by a website server associated with a website of product listings;
   determining a demand for a potential product listing as a function of a characteristic of the product listing responsive to an aggregate of captured product preference criteria for a plurality of consumers; and
   displaying on a display device associated with a computer of a seller a multi-dimensional graph of the demand for the potential product listing so that the seller can gauge market demand prior to listing a product for sale.

7. A method of claim 6, wherein the step of capturing in the database product preference criteria for the consumer by the website server involves the consumer using one or more of the following: a menu, a computerized search, a form, a slider to thereby indicate a range, and a multi-dimensional graph of product listings, and wherein the product preference criteria include price information.

8. A method of claim 6, wherein the step of capturing in the database product preference criteria for the consumer by the website server involves tracking interactions of the consumer with the website of the product listings to thereby derive product preference criteria for the consumer.

9. A method of claim 6, further comprising generating one or more of the following so that the seller can intelligently price the potential product listing:
   a two-dimensional graph plotting the demand as a function of price;
   contour lines for the demand imposed on a pricing graph; and
   a heat map for the demand imposed on a pricing graph wherein the demand is color-coded.

10. A method of claim 8, further comprising prompting for a contact address for the consumer to associate with the captured product preference criteria so that the consumer expressly confirms an interest in receiving an electronic alert regarding new product listings that satisfy the product preference criteria, and wherein displaying on the display device associated with the computer of the seller the multi-dimensional graph of demand for the product involves distinguishing demand expressly confirmed by one or more consumers and unconfirmed demand derived by tracking interactions of one or more consumers.

11. A computer program product, stored on a tangible computer readable memory media, operable on a computer, the computer program product comprising a set of instructions that, when executed by the computer, cause the computer to perform the operations of:

capturing in a database product preference criteria for a consumer by a website server associated with a website of product listings, the product preference criteria including price information;

prompting by the website server for a contact address for the consumer to associate with the captured product preference criteria so that the consumer expressly confirms an interest in receiving an electronic alert regarding new product listings that satisfy the product preference criteria;

determining a number of electronic alerts that will be generated for a potential product listing as a function of price responsive to an aggregate of captured product preference criteria for a plurality of consumers;

displaying on a display device associated with a computer of a seller a multi-dimensional graph of the number of alerts for a potential product listing so that the seller can gauge market demand prior to listing a product for sale and so that the seller can more intelligently price the product;

receiving a new product listing from a seller by the website server; and sending an electronic alert from the website server to the contact address associated with the captured product preference criteria of the consumer responsive to a new product listing that satisfies the criteria.

12. A computer program product of claim 11, wherein the operation of capturing in the database product preference criteria for the consumer by the website server involves the consumer using one or more of the following: a menu, a computerized search, a form, a slider to thereby indicate a range, and a multi-dimensional graph of product listings.

13. A computer program product of claim 11, wherein the operation of capturing in the database product preference criteria for the consumer by the website server involves tracking interactions of the consumer with the website of the product listings to thereby derive product preference criteria for the consumer.

14. A computer program product of claim 11, wherein the operations further comprise generating one or more of the following so that the seller can intelligently price the potential product listing:
   a two-dimensional graph plotting a number of electronic alerts as a function of price;
   contour lines for a number of alerts imposed on a pricing graph; and
   a heat map for a number of alerts imposed on a pricing graph wherein the number of alerts is color-coded.

15. A computer program product of claim 11, wherein the electronic alert includes an invitation for the consumer to access the product listing prior to the product listing being available generally to a public.

16. A computer program product, stored on a tangible computer readable memory media, operable on a computer, the computer program product comprising a set of instructions that, when executed by the computer, cause the computer to perform the operations of:
   capturing in a database product preference criteria for a consumer by a website server associated with a website of product listings, determining a demand for a potential product listing as a function of a characteristic of the product listing responsive to an aggregate of captured product preference criteria for a plurality of consumers; and
   displaying on a display device associated with a computer of a seller a multi-dimensional graph of the demand for the potential product listing so that the seller can gauge market demand prior to listing a product for sale.

17. A computer program product of claim 16, wherein the operation of capturing in the database product preference criteria for the consumer by the website server involves the consumer using one or more of the following: a menu, a computerized search, a form, a slider to thereby indicate a range, and a multi-dimensional graph of product listings, and wherein the product preference criteria include price information.

18. A computer program product of claim 16, wherein the operation of capturing in the database product preference criteria for the consumer by the website server involves tracking interactions of the consumer with the website of the product listings to thereby derive product preference criteria for the consumer.

19. A computer program product of claim 16, wherein the operations further comprise generating one or more of the following so that the seller can intelligently price the potential product listing:
   a two-dimensional graph plotting the demand as a function of price;
   contour lines for the demand imposed on a pricing graph; and
   a heat map for the demand imposed on a pricing graph wherein the demand is color-coded.

20. A computer program product of claim 18, wherein the operations further comprise prompting for a contact address for the consumer to associate with the captured product preference criteria so that the consumer expressly confirms an interest in receiving an electronic alert regarding new product listings that satisfy the product preference criteria, and wherein displaying on the display device associated with the computer of the seller the multi-dimensional graph of demand for the product involves distinguishing demand expressly confirmed by one or more consumers and unconfirmed demand derived by tracking interactions of one or more consumers.

21. A method of claim 1, further comprising generating contour lines for a number of alerts imposed on a pricing graph.

22. A method of claim 1, further comprising generating a heat map for a number of alerts imposed on a pricing graph wherein the number of alerts is color-coded.

* * * * *